US012614929B2

(12) United States Patent
Kim et al.

(10) Patent No.: US 12,614,929 B2
(45) Date of Patent: Apr. 28, 2026

(54) WIRELESS POWER TRANSMITTING DEVICE FOR DETECTING FOREIGN OBJECT AND METHOD FOR OPERATING THE SAME

(71) Applicant: Samsung Electronics Co., Ltd., Gyeonggi-do (KR)

(72) Inventors: Yusu Kim, Gyeonggi-do (KR); Seho Park, Gyeonggi-do (KR); Hyungkoo Chung, Gyeonggi-do (KR); Dohyeon Kim, Gyeonggi-do (KR); Byunghwa Park, Gyeonggi-do (KR); Wooram Lee, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 753 days.

(21) Appl. No.: 17/830,840

(22) Filed: Jun. 2, 2022

(65) Prior Publication Data

US 2023/0047559 A1      Feb. 16, 2023

Related U.S. Application Data

(63) Continuation of application No. PCT/KR2022/007138, filed on May 18, 2022.

(30) Foreign Application Priority Data

Aug. 12, 2021    (KR) ........................ 10-2021-0106417
Nov. 5, 2021    (KR) ........................ 10-2021-0151332

(51) Int. Cl.
H02J 7/00        (2006.01)
H02J 50/12       (2016.01)
(Continued)

(52) U.S. Cl.
CPC ........ H02J 50/60 (2016.02); H02J 7/007188 (2020.01); H02J 50/12 (2016.02); H02J 50/80 (2016.02); H02J 50/90 (2016.02)

(58) Field of Classification Search
None
See application file for complete search history.

(56) References Cited

U.S. PATENT DOCUMENTS

2011/0036260 A1    2/2011  Herbage et al.
2013/0154557 A1    6/2013  Lee et al.
(Continued)

FOREIGN PATENT DOCUMENTS

JP    2017195770 A    10/2017
JP    2021093782 A    6/2021
(Continued)

OTHER PUBLICATIONS

International Search Report dated Aug. 26, 2022.
Korean Office Action dated Nov. 24, 2025.

*Primary Examiner* — Arun C Williams
(74) *Attorney, Agent, or Firm* — CANTOR COLBURN LLP

(57) ABSTRACT

According to an embodiment, a wireless power transmitting device may include a transmission coil, a power providing circuit, and at least one controller. The at least one controller may be configured to control the power providing circuit to apply first power to the transmission coil, identify a resonant frequency, based on a voltage measured at the transmission coil in response to the first power applied to the transmission coil, based on a difference between the identified resonant frequency and a reference frequency meeting a designated condition, identify that a foreign object is placed on a charging area of the wireless power transmitting device, and based on the difference between the identified resonant frequency and the reference frequency failing to meet the (Continued)

designated condition, control the power providing circuit to apply, to the transmission coil, at least one second power for performing communication with a wireless power receiving device.

22 Claims, 22 Drawing Sheets

(51) Int. Cl.
   *H02J 50/60*       (2016.01)
   *H02J 50/80*       (2016.01)
   *H02J 50/90*       (2016.01)

(56)          References Cited

U.S. PATENT DOCUMENTS

| | | | |
|---|---|---|---|
| 2016/0087471 A1 | 3/2016 | Wilson | |
| 2018/0331584 A1 | 11/2018 | Liu et al. | |
| 2019/0131826 A1 | 5/2019 | Park et al. | |
| 2020/0227951 A1 | 7/2020 | Park et al. | |
| 2020/0251929 A1 | 8/2020 | Partovi | |
| 2020/0259373 A1 | 8/2020 | Park et al. | |
| 2021/0167637 A1 | 6/2021 | Schwartz et al. | |
| 2021/0184510 A1 | 6/2021 | Park | |
| 2021/0210983 A1 | 7/2021 | Lee et al. | |
| 2021/0210990 A1* | 7/2021 | Muratov | H02J 50/12 |

FOREIGN PATENT DOCUMENTS

| | | | |
|---|---|---|---|
| KR | 10-2017-0118571 A | 10/2017 | |
| KR | 10-1812444 B1 | 12/2017 | |
| KR | 10-2018-0009294 A | 1/2018 | |
| KR | 10-2018-0117512 A | 10/2018 | |
| KR | 10-2019-0015953 A | 2/2019 | |
| KR | 10-2019-0131469 A | 11/2019 | |
| KR | 10-2020-0088064 A | 7/2020 | |
| KR | 10-2021-0000334 A | 1/2021 | |
| KR | 10-2198183 B1 | 1/2021 | |
| KR | 10-2021-0089529 A | 7/2021 | |
| KR | 10-2021-0137888 A | 11/2021 | |
| WO | 2021-115913 A1 | 6/2021 | |

* cited by examiner

WIRELESS POWER TRANSMITTING DEVICE FOR DETECTING FOREIGN OBJECT AND METHOD FOR OPERATING THE SAME

CROSS-REFERENCE TO RELATED APPLICATION(S)

This application is a continuation application of International Application No. PCT/KR2022/007138 designating the United States, filed on May 18, 2022, in the Korean Intellectual Property Receiving Office and claiming priorities to Korean Patent Application No. 10-2021-0106417, filed on Aug. 12, 2021, in the Korean Intellectual Property Office, and Korean Patent Application No. 10-2021-0151332, filed on Nov. 5, 2021, in the Korean Intellectual Property Office, the disclosures of which are incorporated by reference herein in their entireties.

BACKGROUND

Technical Field

One or more embodiments disclosed herein generally relate to a wireless power transmitting device for detecting a foreign object and method for operating the same.

Description of Related Art

The wireless power transmission standard defined by the wireless power consortium (WPC) (e.g., Qi standard) supports various foreign object detection (FOD) techniques. For example, during standby, an electronic device that wirelessly transmits power may apply a ping signal to a coil and determine whether a wireless power receiving device or a foreign object is placed in the charging area depending on changes in characteristics (e.g., quality factor (Q-factor)).

In another example, during the negotiation phase, the wireless power transmitting device may determine whether a foreign object, that is not the wireless power receiving device, is in the charging area by using a reference Q-factor identified based on the information received from the wireless power receiving device.

In yet another example, during power transfer, the wireless power transmitting device may receive (or demodulate and/or decode) information about the level of the power received from the wireless power receiving device. The electronic device may identify the level of the power loss $F_{loss}$ based on information about the level of transmission power $P_{PT}$ and the level of reception power $P_{PR}$ and determine whether a foreign object is in the charging area during power transfer based on the level of power loss $F_{loss}$. The power loss $F_{loss}$ when there is foreign object may indicate the level of power dissipated in the foreign object from the magnetic field generated by the electronic device. The electronic device may identify the level of transmission power $P_{PT}$ by subtracting the internal power loss $P_{PTloss}$ dissipated in the electronic device from the level of power $P_{in}$ provided to an input terminal of the wireless power receiving device. The internal power loss $P_{PTfloss}$ in the electronic device may be caused by, for example, power loss in the inverter, power loss in the primary coil, power loss in the resonant capacitor, power loss in the shielding of the primary coil assembly, and/or power loss in any metal part of the electronic device. Further, the reception power $P_{PR}$ may be identified by the wireless power receiving device by adding the level of power $P_{out}$ at the output terminal of the power-transmitting electronic device and the internal power loss $P_{prloss}$ dissipated in the wireless power receiving device. The internal power loss $P_{prloss}$ of the wireless power receiving device may be caused by, for example, power loss in the rectifier, power loss in the secondary coil, power loss in the resonant capacitor, power loss in the shielding of the secondary coil assembly, and/or power loss in any metallic part of the wireless power receiving device.

SUMMARY

According to the current Qi standard, the wireless power transmitting device may apply a ping signal in the standby phase and identify whether a foreign object or wireless power receiving device is placed in the charging area based on a change in the Q-factor, but it may not be able to distinguish between placement of a foreign object in the charging area or whether the wireless power receiving device is misaligned. Further, when a foreign object is placed in the charging area, the wireless charging process may not proceed to the negotiation phase or power transfer phase. Thus, devices using the Qi standard may not be able to employ techniques for the negotiation phase or power transfer phase to detect foreign objects. Meanwhile, to ensure user safety, stronger regulations are being introduced for heat generation during wireless power transmission and reception. For example, the IEC62368 standard reflects regulations on the wireless power transmitting device, and the standard specifies that a specific temperature (e.g., 70° C.) or less should be maintained, and accordingly, accurate judgment of foreign object placement is required. However, devices using the current Qi standard are unable to distinguish between a misalignment of the wireless power receiving device and placement of a foreign object and thus, when the wireless power receiving device is placed in the charging area, the power transmission device may output a notification indicating an error, leading the user to recognize that the wireless power transmitting device has a failure. But in this case, the user may only believe that there is a foreign object, and may fail to consider that the wireless power receiving device is misaligned.

According to an embodiment, a wireless power transmitting device may comprise a transmission coil, a power providing circuit, and at least one controller. The at least one controller may be configured to control the power providing circuit to apply first power to the transmission coil, identify a resonant frequency, based on a voltage measured at the transmission coil in response to the first power applied to the transmission coil, based on a difference between the identified resonant frequency and a reference frequency meeting a designated condition, identify that a foreign object is placed on a charging area of the wireless power transmitting device, based on the difference between the identified resonant frequency and the reference frequency failing to meet the designated condition, control the power providing circuit to apply, to the transmission coil, at least one second power for performing communication with a wireless power receiving device, based on receiving at least one response from the wireless power receiving device while applying the at least one second power, identify a reference Q-factor and/or another reference frequency based on the at least one response, identify whether the wireless power receiving device is placed on the charging area, or both the wireless power receiving device and the foreign object are placed on the charging area, based on a difference between an identified Q-factor and the reference Q-factor and/or a difference between the identified resonant frequency and the other reference frequency, and based on receiving no response from the wireless power receiving device while applying the at least one second power, identify that the wireless power receiving device is placed a designated distance or more away from a point of the charging area of the wireless power transmitting device.

According to an embodiment, a method for operating a wireless power transmitting device including a transmission coil and a power providing circuit may comprise controlling the power providing circuit to apply first power to the transmission coil, identifying a resonant frequency, based on a voltage measured at the transmission coil in response to the first power applied to the transmission coil, based on a difference between the identified resonant frequency and a reference frequency meeting a designated condition, identifying that a foreign object is placed on a charging area of the wireless power transmitting device, based on the difference between the identified resonant frequency and the reference frequency failing to meet the designated condition, controlling the power providing circuit to apply, to the transmission coil, at least one second power for performing communication with a wireless power receiving device, based on receiving at least one response from the wireless power receiving device while applying the at least one second power, identifying a reference Q-factor and/or another reference frequency based on the at least one response, identifying whether the wireless power receiving device is placed on the charging area, or both the wireless power receiving device and the foreign object are placed on the charging area, based on a difference between an identified Q-factor and the reference Q-factor and/or a difference between the identified resonant frequency and the other reference frequency, and based on receiving no response from the wireless power receiving device while applying the at least one second power, identifying that the wireless power receiving device is placed a designated distance or more away from a point of the charging area of the wireless power transmitting device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference numerals.

DETAILED DESCRIPTION

According to certain embodiments, a wireless power transmitting device and a method for operating the same may identify whether a foreign object is placed in the charging area, while a wireless power receiving device is absent in the charging area, based on a change in resonant frequency identified after the application of the Q ping signal stops.

Figure 1:
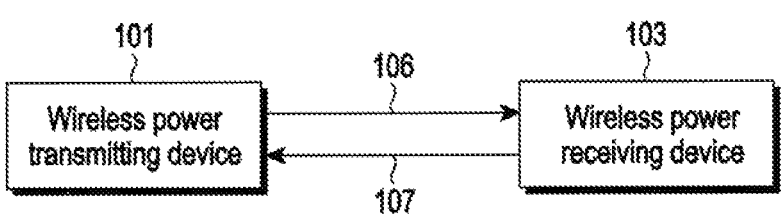
FIG. 1 is a block diagram illustrating a wireless power transmitting device and a wireless power receiving device according to an embodiment.

FIG. 1 is a block diagram illustrating a wireless power transmitting device and a wireless power receiving device according to an embodiment.

Referring to FIG. 1, according to an embodiment, a wireless power transmitting device 101 may wirelessly transmit power 106 to a wireless power receiving device

103. In addition, the wireless power transmitting device 101 may receive information 107 from the wireless power receiving device 103. For example, the wireless power transmitting device 101 may transmit power 106 using induction (hereinafter referred to as an "induction scheme"). To implement the induction scheme, the wireless power transmitting device 101 may include at least one of, e.g., a power source, a DC-DC conversion circuit (e.g., DC/DC converter), DC-AC conversion circuit (e.g., inverter), an amplifying circuit, an impedance matching circuit, at least one capacitor, at least one coil, or a communication modulation circuit. The at least one capacitor together with the at least one coil may constitute a resonance circuit. The wireless power transmitting device 101 may be implemented the WPC Qi standard. The wireless power transmitting device 101 may include a coil that is capable of producing a magnetic field due to induction when an electric current flow thereacross. The process of the wireless power transmitting device 101 producing an induced magnetic field may be referred to as the wireless power transmitting device 101 wirelessly transmitting the power 106. Further, an induced electromotive force (or current, voltage, and/or power) may be generated by the magnetic field around the coil of the wireless power receiving device 103. The process of producing an induced electromotive force through the coil may be referred to as the wireless power receiving device 103 wirelessly receives the power 106.

According to an embodiment, the wireless power transmitting device 101 may communicate with the wireless power receiving device 103. For example, the wireless power transmitting device 101 may communicate with the wireless power receiving device 103 by using in-band communication. The wireless power transmitting device 101 may modulate data to be transmitted according to, e.g., a frequency shift keying (FSK) modulation scheme, and the wireless power receiving device 103 may perform modulation according to an amplitude shift keying (ASK) modulation scheme, in order to send and receive information 107 between the devices. The wireless power transmitting device 101 may identify the information 107 provided by the wireless power receiving device 103 based on the amplitude of the current and/or voltage applied to the transmission coil. In FIG. 1, the wireless power receiving device 103 is shown as directly transmitting the information 107 to the wireless power transmitting device 101, but this is merely an example, and it will be appreciated by one of ordinary skill in the art that that the wireless power receiving device 103 only controls on/off of at least one switch therein. The operation of performing modulation based on the ASK modulation scheme and/or FSK modulation scheme may be referred to as in-band data transmission, and the operation of performing demodulation based on the ASK demodulation scheme and/or FSK demodulation scheme may be referred to as in-band data reception. Meanwhile, in-band data transmission/reception is merely an example, and it will be appreciated by one of ordinary skill in the art that the wireless power transmitting device 101 and the wireless power receiving device 103 may transmit/receive data via out-of-band communication (e.g., Bluetooth low energy (BLE) or various short-range communication protocols) as well.

In the disclosure, that the wireless power transmitting device 101 or the wireless power receiving device 103 performs a specific operation may mean that various pieces of hardware included in the wireless power transmitting device 101 or the wireless power receiving device 103, e.g., a controller (e.g., micro-controlling unit (MCU), field programmable gate array (FPGA), application specific integrated circuit (ASIC), microprocessor, or application processor (AP)) performs the specific operation. Or, that the wireless power transmitting device 101 or the wireless power receiving device 103 performs a specific operation may also mean that the controller controls another hardware device to perform the specific operation. That the wireless power transmitting device 101 or the wireless power receiving device 103 performs a specific operation may mean that the controller or another hardware device triggers the specific operation as an instruction for performing the specific operation, which is stored in a storage circuit (e.g., a memory) of the wireless power transmitting device 101 or the wireless power receiving device 195, is executed.

Figure 2:
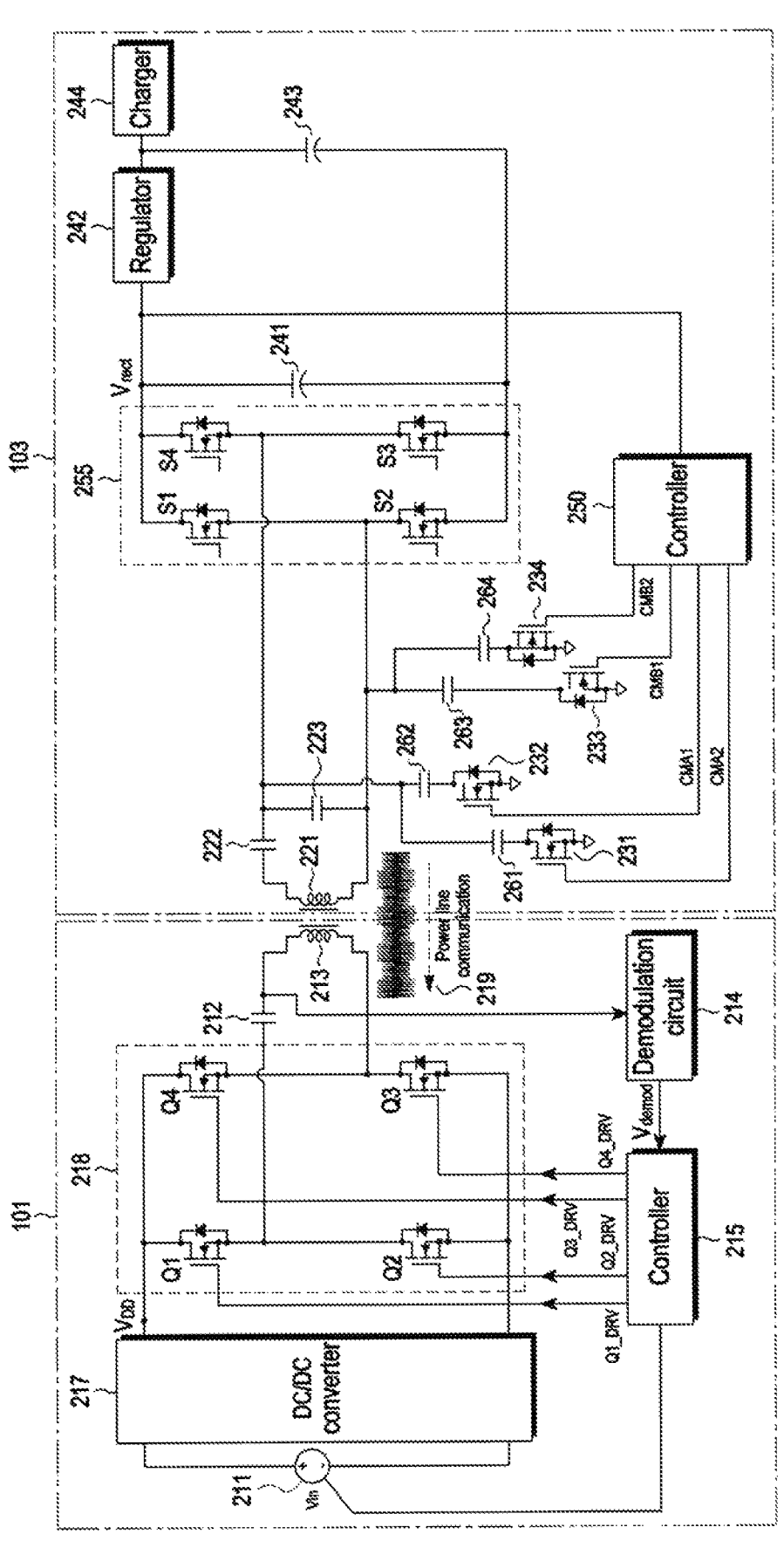
FIG. 2 is a block diagram illustrating a wireless power transmitting device and a wireless power receiving device according to an embodiment.

FIG. 2 is a block diagram illustrating a wireless power transmitting device and a wireless power receiving device according to an embodiment.

According to an embodiment, the wireless power transmitting device 101 may include at least one of a power source 211, an inverter 218 including a plurality of switches Q1, Q2, Q3, and Q4, a capacitor 212, a transmission coil 213, a demodulation circuit 214, a controller 215, or a DC/DC converter 217.

According to an embodiment, the power provided by the power source 211 may be provided to the DC/DC converter 217. The power source 211 may include at least one of an interface for connection with an external travel adapter (TA), a battery (not shown) of the wireless power transmitting device 101, a charger (not shown), or a power management integrated circuit (PMIC) (not shown). The power source 211 may provide, e.g., DC power to the DC/DC converter 217, but the type of power provided is not limited. The DC/DC converter 217 may convert the voltage of the received power and provide it to the inverter 218. The DC/DC converter 217 may change the voltage of the received DC power and provide the DC power having the changed voltage (or driving voltage $V_{DD}$) to the inverter 218. The DC/DC converter 217 may perform, e.g., buck conversion and/or boost conversion and may be implemented as, e.g., a 3-level converter, but it will be appreciated by one of ordinary skill in the art that it is not limited in type.

According to an embodiment, the inverter 218 may output AC power using the driving voltage $V_{DD}$ received from the DC/DC converter 217. The plurality of switches Q1, Q2, Q3, and Q4 may constitute, e.g., a full bridge circuit, but the number of switches or the type of bridge circuit is not limited. For example, when a full bridge circuit is configured, one end of the transmission coil 213 may be connected to a connection point between the switches Q1 and Q2 through the capacitor 212, and the other end of the transmission coil 213 may be connected to the connection point between the switches Q3 and Q4. The plurality of switches Q1, Q2, Q3, and Q4 may be controlled to be on or off. For example, to generate AC power, the controller may control the second switch Q2 and the fourth switch Q4 in the off state while controlling the first switch Q1 and the third switch Q3 in the on state during a first period and may control the second switch Q2 and the fourth switch Q4 in the on state while controlling the first switch Q1 and the third switch Q3 in the off state during a second period and may repeatedly perform the above-described control operations. The controller 215 may provide the control signals Q1_DRV, Q2_DRV, Q3_DRV, and Q4_DRV for generating AC power described above to the plurality of switches Q1, Q2, Q3, and Q4. Here, control by the controller 215 may be implemented by outputting control signals and also refraining from outputting control signals. For example, that the controller 215 outputs the first control signal for generation of AC power having a first frequency to the inverter 218 may mean that the controller 215 may output the control signals Q1_DRV and Q3_DRV for controlling the switches Q1 and Q3 to be in the on state during a first period corresponding to the first frequency and then output the control signals Q2_DRV and Q4_DRV for controlling the switches Q2 and Q4 to be in the on state during the period corresponding to the first period, and repeat the above-described output operations. Meanwhile, that the controller 215 outputs the second control signal for generation of AC power having a second frequency to the inverter 218 may mean that the controller 215 may output the control signals Q1_DRV and Q3_DRV for controlling the switches Q1 and Q3 to be in the on state during a second period corresponding to the second frequency and then output the control signals Q2_DRV and Q4_DRV for controlling the switches Q2 and Q4 to be in the on state during the period corresponding to the second period, and repeat the above-described output operations. In this case, the period corresponding to the second frequency may differ from the period corresponding to the first frequency. At least one of the DC/DC converter 217 or the inverter 218 may be referred to as a power providing circuit. The controller 215 may control the power providing circuit (e.g., at least one of the DC/DC converter 217 or the inverter 218) to apply power (e.g., 301, 303, 304, or 305) to the transmission coil 213.

According to an embodiment, the AC power generated by the inverter 218 may be applied to the transmission coil 213. The capacitor 212 together with the transmission coil 213 may form a resonant circuit. The transmission coil 213 may generate a magnetic field based on the applied AC power. Part of the magnetic field (or magnetic flux) generated by the transmission coil 213 may pass through the cross section of the reception coil 221 of the wireless power receiving device 103. As the magnetic field passing through the cross section of the reception coil 221 is changed over time, an induced electromotive force (e.g., current, voltage, or power) may be generated around the reception coil 221.

According to an embodiment, the demodulation circuit 214 may demodulate the signal applied to the transmission coil 213 (e.g., the voltage 219 applied to both ends of the transmission coil 213) and output a demodulation signal $V_{demod}$. The demodulation circuit 214 may output the demodulation signal $V_{demod}$ by down-converting the signal applied to the transmission coil 213 (e.g., the voltage 219 between both the ends) by the frequency (e.g., 100 kHz to 210 kHz) of the AC power. For example, the demodulation circuit 214 may include a mixer and/or a multiplier circuit for removing the carrier wave component (e.g., 100 kHz to 210 kHz which is the frequency of the AC power) for wireless power transmission. Here, since the mixed waveform of the component by the modulation of the wireless power receiving device 103 and the AC power component by the wireless power transmitting device 101 may be applied to both the ends of the coil 213 of the wireless power transmitting device 101, the frequency component (e.g., 100 kHz to 210 kHz) of the AC power is named the carrier wave component, but it will be appreciated by one of ordinary skill in the art that the wireless power receiving device 103 does not actually generate the electromagnetic wave which is the mixture of the carrier wave and the modulated data. Thus, the carrier wave component (e.g., the frequency of AC power, 100 kHz to 210 kHz) may be removed from the voltage between both the ends of the transmission coil 213. The demodulation circuit 214 may additionally filter (low pass filter) the demodulation signal $V_{demod}$ and output it. To do so, the demodulation circuit 214 may include a low pass filter. Or, the demodulation circuit 214 may filter the voltage 219 between both the ends of the transmission coil 213 and then down-convert it by the frequency (e.g., 100 kHz to 210 kHz) of AC power, thereby generating the demodulation signal $V_{demod}$. The amplitude of the voltage 219 between both the ends of the transmission coil 213 may be changed according to the ASK demodulation of the wireless power receiving device 103. According to an embodiment, the controller 215 may identify the information provided from the wireless power receiving device 103, based on the demodulation signal $V_{demod}$ output by the demodulation circuit 214. The controller 215 may perform, e.g., analog-to-digital conversion (ADC) on the demodulation signal $V_{demod}$. The controller 215 may decode the digital value obtained as a result of the ADC and identify the information provided by the wireless power receiving device 103 according to the result of decoding. It will be appreciated by one of ordinary skill in the art that the decoding scheme may follow, e.g., the Qi standard, but is not limited. Meanwhile, in the above-described embodiment, the demodulation circuit 214 performs frequency down-conversion (e.g., carrier wave removal) and/or low-pass filtering, and the controller 215 performs ADC and/or decoding, but this is merely an example. According to other embodiments, it will be appreciated by one of ordinary skill in the art that the demodulation circuit 214 may be implemented to further perform at least one of ADC or decoding and, according to another embodiment, the controller 215 may be implemented to further perform frequency down-conversion (e.g., carrier wave removal) and/or low-pass filtering.

According to an embodiment, the wireless power receiving device 103 may include at least one of a reception coil 221, a capacitor 222, a capacitor 223, a rectification circuit 255, a controller 250, a plurality of capacitors 261, 262, 263, and 264, a plurality of switches 231, 232, 233, and 234, a capacitor 241, a regulator 242, a capacitor 243, or a charger 244.

According to an embodiment, the reception coil 221, the capacitor 222, and the capacitor 223 may constitute a resonance circuit. One end of the capacitor 222 may be connected to the reception coil 221, and the other end of the capacitor 222 may be connected to one end of the capacitor 223 and one end of the rectification circuit 255. One end of the capacitor 223 may be connected to the other end of the capacitor 222, and the other end of the capacitor 223 may be connected to the other end of the reception coil 221. In other words, the capacitor 223 may be connected in parallel to a circuit formed by the reception coil 221 and the capacitor 222 connected in series. The other end of the capacitor 223 may be connected to the other end of the rectification circuit 255.

According to an embodiment, the rectification circuit 255 may include a plurality of switches S1, S2, S3, and S4 constituting the full bridge circuit. One end of the resonance circuit may be connected to a connection point between the switches S1 and S2, and the other end of the resonance circuit may be connected to the connection point between the switches S3 and S4. The rectification circuit 255 may convert the AC power, received through the reception coil 221, into DC power. The controller 250 may control the on/off states of the plurality of switches S1, S2, S3, and S4 to convert AC power into DC power.

According to an embodiment, the capacitor 241 and the regulator 242 may be connected to the rectification circuit 255. One end of the capacitor 241 may be grounded. The regulator 242 may perform converting (e.g., buck converting and/or boost converting) and/or regulating on the voltage of the rectified power output from the power conversion circuit.

According to an embodiment, the charger 244 may charge the battery (not shown) with the power converted and/or regulated by the regulator 242. According to an embodiment, the charger 244 may control the voltage and/or current for charging the battery according to various battery charging modes (e.g., constant current (CC) mode, constant voltage (CV) mode, or quick charging mode). According to the implementation, a PMIC (not shown) in place of the charger 244 may be coupled to the regulator 242.

According to an embodiment, the controller 250 may perform modulation in response to information to be provided. The controller 250 may determine a capacitor in the plurality of capacitors 261, 262, 263, and 264 to be modulated. The difference in amplitude of the voltage 219 sensed by the wireless power transmitting device 101 may be changed due to modulation of the capacitor. For example, it is assumed that the difference in the amplitude of the voltage 219 sensed in the wireless power transmitting device 101 (e.g., the difference between the maximum amplitude of the voltage 219 while the switch 231 is in the on state and the maximum amplitude of the voltage 219 while the switch 231 is in the off state) when modulation is performed with only one capacitor 261 is a first value. In this case, since the capacitors 262, 263, and 264 are not used for modulation, the switches 232, 233, and 234 may remain off. Meanwhile, the difference in the amplitude of the voltage 219 sensed in the wireless power transmitting device 101 (e.g., the difference between the maximum amplitude of the voltage 219 while the switches 231 and 232 are in the on state and the maximum amplitude of the voltage 219 while the switches 231 and 232 are in the off state) when modulation is performed with the capacitor 261 and the capacitor 262 is a second value which may be larger than the first value. In this case, since the capacitors 263 and 264 are not used for modulation, the switches 233 and 234 may remain off. The wireless power receiving device 103 may adjust the modulation degree (or modulation depth) as the capacitor to be modulated in the plurality of capacitors 261, 262, 263, and 264 is adjusted. As described above, the controller 215 may output and/or refrain from outputting at least some of the control signals CMA1, CMA2, CMB1, and CMB2 to maintain the on/off states of the switches corresponding to the capacitors, while performing modulation. Meanwhile, for example, the capacitance of the capacitor 262 may be smaller than the capacitance of the capacitor 261, and the capacitance of the capacitor 264 may be smaller than the capacitance of the capacitor 263, but this is merely an example, and the magnitude relationship in capacitance is not limited thereto, and the capacitances may be identical.

Figure 3:
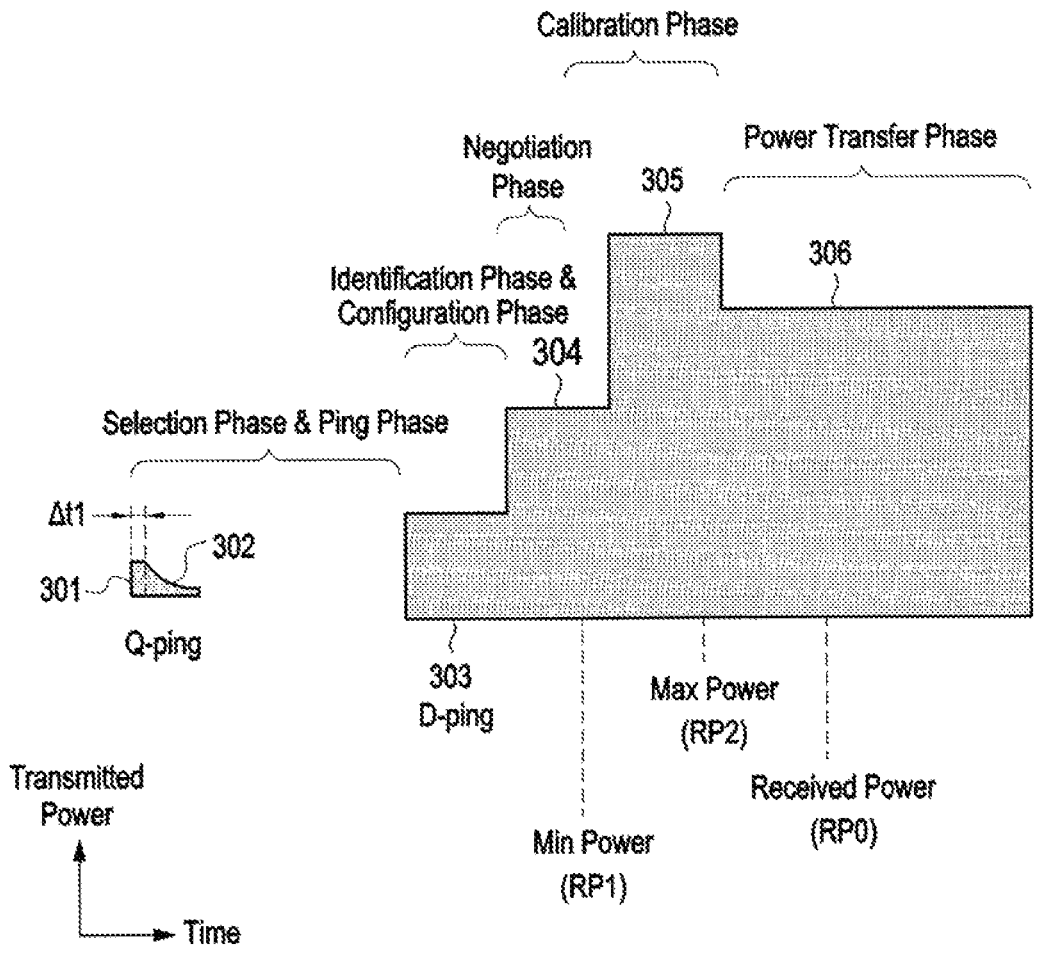
FIG. 3 illustrates the level of power input to a transmission coil of a wireless power transmitting device according to an embodiment.

FIG. 3 illustrates the level of power input to a transmission coil of a wireless power transmitting device according to an embodiment.

According to an embodiment, the wireless power transmitting device 101 may apply a ping signal 301 to the transmission coil 213 for duration Δt1. When the application of the ping signal 301 is terminated, the power 302 of the transmission coil 213 of the wireless power transmitting device 101 may be attenuated. For example, the attenuation in the time domain of the envelope of the voltage V(t) for the power 302 may follow Equation 1.

$$V(t) = V(0) \cdot \exp[\frac{-\omega \cdot t}{2 \cdot Q}]$$ [Equation 1]

V(0) may be the initial voltage value, ω may be the angular frequency of the AC signal, and Q may be the Q-factor. Accordingly, the Q-factor may be calculated using Equation 2, based on the voltages V₁ and V₂ corresponding to two time points $t_1$ and $t_2$ constituting the envelope. In Equation 2, T may be the period that is the reciprocal of the frequency, and it may be identified, e.g., based on a plurality of time points constituting the envelope (e.g., the interval between time points corresponding to peaks).

$$Q = \frac{\pi \cdot (t_1 - t_2)}{T \cdot \ln[\frac{V(t_2)}{V(t_1)}]}$$ [Equation 2]

As described above, the wireless power transmitting device 101 may perform Q-factor measurement based on the application of the ping signal 301. Meanwhile, the Q-factor measurement based on Equation 2 is merely exemplary, and the measurement scheme is not limited. The wireless power transmitting device 101 may store the Q-factor when no foreign object is placed as a reference Q-factor. When a foreign object or a wireless power receiving device is placed on the charging area of the wireless power transmitting device 101, the Q-factor may be changed (e.g., decreased). If a Q-factor measured later has a difference from the reference Q-factor by out of a tolerance range, the wireless power transmitting device 101 may identify that the wireless power receiving device 103 or a foreign object is placed. Meanwhile, according to an embodiment, the wireless power transmitting device 101 may determine whether a foreign object is placed on the charging area without the wireless power receiving device 103, based on a change in resonant frequency in addition to the Q-factor, and this is described below. The detection of placement of the wireless power receiving device 103 or a foreign object based on Q-factor and application of the ping signal 301 may be performed in, e.g., the standby phase, and the ping signal 301 may be named Q-ping, or for convenience, "first power."

Based on the result of comparison between the reference Q-factor and a current Q-factor, if there is a difference, the wireless power transmitting device 101 may apply a digital ping signal 303 (or referred to as "second power" for convenience). While the digital ping signal 303 is applied, the wireless power transmitting device 101 may perform at least one operation corresponding to the identification phase and configuration phase with the wireless power receiving device 103 and such operations may follow, e.g., the Qi standard, but embodiments of the disclosure are not limited thereto. As described above, the wireless power transmitting device 101 and the wireless power receiving device 103 may perform in-band communication. When the wireless power transmitting device 101 fails to obtain data from the wireless power receiving device 103 while the digital ping signal 303 is applied (e.g., upon failing to identify valid data as a result of demodulation), the wireless power transmitting device 101 may determine that a foreign object is placed in the charging area. When the operations in the identification phase and configuration phase are successfully completed, the wireless power transmitting device 101 may perform at least one operation corresponding to the negotiation phase while applying power 304, and such operations may follow, e.g., the Qi standard, but embodiments of the disclosure are not limited. The wireless power transmitting device 101 may receive a first received power packet RP 1 from the wireless power receiving device 103. Based on the reception of the first received power packet RP1, the wireless power transmitting device 101 may enter a calibration phase. However, in another implementation, the wireless power transmitting device 101 may receive the first received power packet after entering the calibration phase. Further, in the example of FIG. 3, although the calibration phase is shown as differing from the power transfer phase, this is merely an example, and the calibration phase may be understood as part of the power transfer phase.

According to an embodiment, the wireless power receiving device 103 may provide the wireless power transmitting device 101 with a report for information about the strength of received power in a plurality of load states (e.g., a light load state and a heavy load state) in the calibration phase. Here, the load states may be classified based on the level of the current input to the load of the wireless power receiving device 103 (or the level of the current output from the rectifier and/or the converter). The state in which the level of the current input to the load is relatively small may be referred to as a light state, and the state in which the level of the current input to the load is relatively large may be referred to as a heavy state, but such naming convention is merely an example.

According to an embodiment, the wireless power receiving device 103 may transmit the first received power packet PR1 including the received power level in a first load state. The wireless power receiving device 103 may identify the received power level based on the level of the received power and transmit, e.g., modulate, the first received power packet PR1 including the power level. Here, the received power level is a value according to, e.g., the Qi standard, and may be a received power value or an estimated received power value. The received power level may be obtained as a result of processing (e.g., processing as defined in the Qi standard) the power level (e.g., in watts) measured (or estimated) by the wireless power receiving device 103 but, without limitations thereto, the measured (or estimated) power level may be determined in other ways. The first received power packet RP1 is for indicating a first calibration data point, and the received power level included in the first received power packet RP1 may be not more than 10% of the reference power level included in the power transfer contract. The first received power packet may have, e.g., a type value of "1" (e.g., 001), and the wireless power transmitting device 101 may identify that the first received power packet RP1 is received based on the type value of "1." The wireless power transmitting device 101 may receive a second received power packet RP2 from the wireless power receiving device 103 while the power 305 is applied. The wireless power receiving device 103 may transmit the second received power packet RP2 including the received power level in a second load state. The second received power packet RP2 may be for indicating a second calibration data point (or its subsequent data point) and may be a value close to the reference power level included in the power transmission contract. The second received power packet may have, e.g., a type value of "2," and the electronic device 101 may identify that the second received power packet RP2 is received based on the type value of "2" (e.g., 010).

According to an embodiment, the wireless power transmitting device 101 may calculate a parameter based on the values of two calibration data points. The two calibration data points are merely an example, and there is no limit to the number of them. For example, the wireless power transmitting device 101 may identify the transmitted power level $$\left(P^1_{transmitted}\right)$$

and received power level $$\left(P^1_{received}\right)$$

in the first load state and the transmitted power level $$\left(P^2_{transmitted}\right)$$

and received power level $$\left(P^2_{received}\right)$$

in the second load state (e.g., a connected load state). The wireless power transmitting device 101 may identify the slope (a) based on the interpolation as illustrated in Equation 3 and may identify the intercept (b) as illustrated in Equation 4.

$$a = \frac{P^2_{received} - P^1_{received}}{P^2_{transmitted} - P^1_{transmitted}} \qquad \text{[Equation 3]}$$

$$b = \frac{P^2_{transmitted} \cdot P^1_{received} - P^2_{received} \cdot P^1_{transmitted}}{P^2_{transmitted} - P^1_{transmitted}} \qquad \text{[Equation 4]}$$

According to an embodiment, the wireless power transmitting device 101 may enter a power transfer phase and apply power 306 for charging. The wireless power receiving device 103 may identify the power $P_{transmitted}$ transmitted in the power transfer phase and calibrate the same, as in Equation 5, into the power $P_{calibrated}$.

$$P_{calibrated} = a \cdot P_{transmitted} + b \qquad \text{[Equation 5]}$$

Further, the wireless power transmitting device 101 may identify the power loss $P_{loss}$ based on Equation 6.

$$P_{loss} = P_{calibrated} - P_{received} \qquad \text{[Equation 6]}$$

$P_{received}$ in Equation 6 may be the reception power level in the wireless power receiving device 103 identified based on in-band communication from the wireless power receiving device 103. The wireless power transmitting device 101 may determine whether a foreign object is placed while power transmission is underway based on whether the power loss $P_{loss}$ is greater than or equal to a preset reference value. Alternatively, the wireless power transmitting device 101 may calculate the power loss using the result of performing calibration on the strength of the received power. Meanwhile, the above-described method for obtaining parameters (e.g., a and b) for a linear model based on the two calibration data is merely an example. Alternatively, the wireless power transmitting device 101 may identify the calibration curve by processing (e.g., interpolating) a plurality of calibration data. The wireless power transmitting device 101 may identify an effective foreign object detection (FOD) threshold from the calibration curve. The wireless power transmitting device 101 may detect a foreign object based on whether the result of subtracting the received power level from the level of the transmitted power is greater than the effective FOD threshold. According to certain embodiments, the wireless power transmitting device 101 may determine whether a foreign object is placed in the charging area during the power transfer phase based on at least one parameter (e.g. a and/or b above), the received power level included in the received power packet (e.g., RP0), and the power 306 for charging in the power transfer phase.

As described above, in the standby phase, the wireless power transmitting device 101 may measure the Q-factor based on attenuation, in the time domain, of the envelope of the voltage V(t) for the power 302 after the ping signal 301 is applied. The wireless power transmitting device 101 may identify placement, in the charging area, of the wireless power receiving device 103 or a foreign object, based on the difference between the measured Q-factor and the reference Q-factor. According to the current Qi standard, if no response is identified from the wireless power receiving device 103 while the digital ping (D ping) 303 is applied (or within a threshold time after the digital ping is applied), the wireless power transmitting device 101 determines that a foreign object is placed but, in some cases, no response may be identified even when the wireless power receiving device 103 is placed in the charging area, for example when the wireless power receiving device 103 is misaligned. Accordingly, it is impossible to precisely determine whether a foreign object is placed in the charging area or the wireless power receiving device 103 is placed in the charging area, only with measurement of the Q-factor.

Figure 4A:
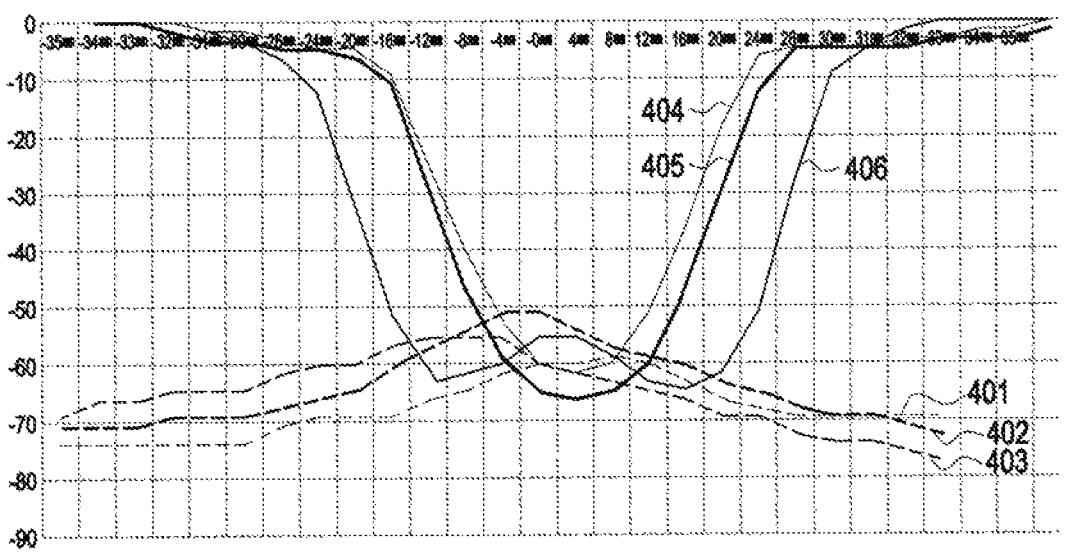
FIG. 4A is a graphs illustrating results of experimenting with changes in Q-factor measured when a plurality of different types of wireless power receiving devices and a plurality of different types of foreign objects are placed.

FIG. 4A is a graphs illustrating results of experimenting with changes in Q-factor measured when a plurality of different types of wireless power receiving devices and a plurality of different types of foreign objects are placed.

In FIG. 4A, the x axis may denote the distance in two-dimensions from one point (e.g., center point) of the charging area of the wireless power transmitting device 101. For example, +8 mm may mean that one point (e.g., center point) of the wireless power receiving device 103 or one point (e.g., center point) of the foreign object is placed 8 mm away from the one point (e.g., center point) of the charging area in a first direction (this may be referred to as a + direction). For example, −8 mm may mean that one point (e.g., center point) of the wireless power receiving device 103 or one point (e.g., center point) of the foreign object is placed 8 mm away from the one point (e.g., center point) of the charging area in a second direction (this may be referred to as a − direction) opposite to the first direction. The y-axis may denote the percentage of the difference between the measured Q-factor and the reference Q-factor. For example, the value of the y-axis may be a value obtained by dividing the value, obtained by subtracting the reference Q-factor from the measured Q-factor, by the reference Q-factor, and multiplying the resultant value by 100. For convenience of description, the value of the y-axis may be named as the Q-factor variation. Meanwhile, in another example, the measured Q-factor may be subtracted from the reference Q-factor, and in this case, the sign and/or the magnitude relationship of the threshold may be changed. Alternatively, it will be understood by one of ordinary skill in the art that in another example, the absolute value of the difference between the reference Q-factor and the Q-factor may be used.

In FIG. 4A, the first graph 401 is the result of measurement of the Q-factor variation at various points for a first type of wireless power receiving device. The second graph 402 is the result of measurement of the Q-factor variation at various points for a second type of wireless power receiving device. The third graph 403 is the result of measurement of the Q-factor variation at various points for a third type of wireless power receiving device. The fourth graph 404 is the result of measurement of the Q-factor variation at various points for a first type of foreign object (e.g., an aluminum ring). The fifth graph 405 is the result of measurement of the Q-factor variation at various points for a second type of foreign object (e.g., an aluminum foil). The sixth graph 406 is the result of measurement of the Q-factor variation at various points for a third type of foreign object (e.g., an iron disk). In the range of −20 mm to 12 mm in FIG. 4A, there is no significant difference between the y-axis values of the graphs 401 to 406, and the magnitude relationship is not clear. Thus, the Q-factor variation alone may not give a precise determination as to whether the object placed on the charging area is a foreign object or the wireless power receiving device. For example, at the point of 0 mm, graphs 404 and 406 of foreign objects have values larger than or equal to "−60" of the third graph 403, which is the smallest value among the wireless power receiving devices, and the graph 405 of foreign object has a value smaller than "−60" of the third graph 403, so that it may be difficult to set a precise threshold for distinguishing between the wireless power receiving device and the foreign object. In general, within the range of −20 mm to +20 mm of the center of the charging area, it is impossible to precisely distinguish the respective y-axis values of the graphs 401, 402, 403, 404, 405, and 406, with one threshold, and it is difficult to precisely determine whether the wireless power receiving device or the foreign object, or both the wireless power receiving device and the foreign object are present, only with the Q-factor variation.

Figure 4B:
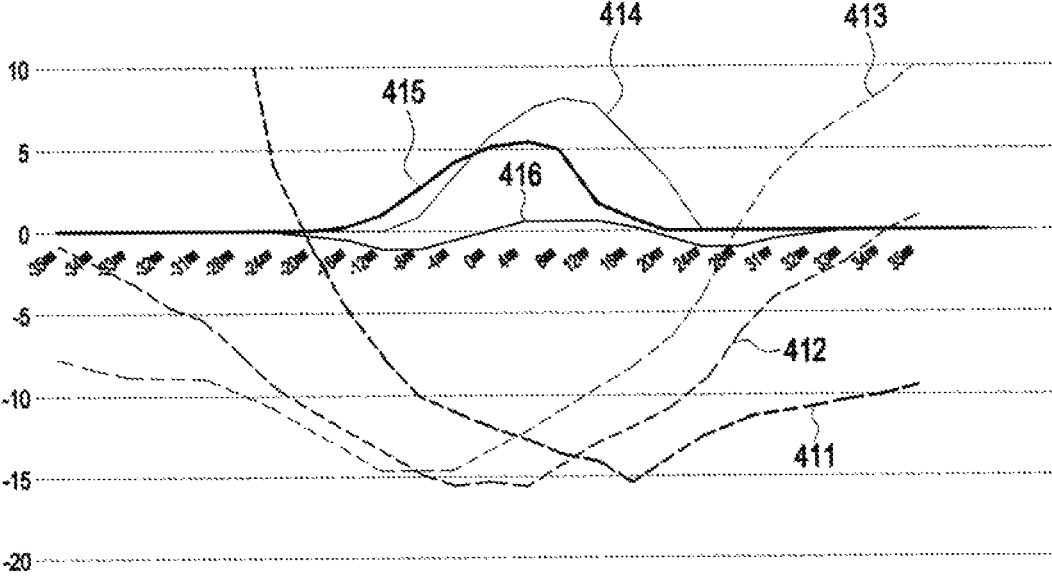
FIG. 4B is a graphs illustrating results of experimenting with changes in resonant frequency measured when a plurality of different types of wireless power receiving devices and a plurality of different types of foreign objects are placed.

FIG. 4B is graphs illustrating results of experimenting with changes in resonant frequency measured when a plurality of different types of wireless power receiving devices and a different plurality of types of foreign objects are placed.

In FIG. 4B, the x axis may denote the distance in two-dimensions from one point (e.g., center point) of the charging area of the wireless power transmitting device 101. The y-axis may denote the percentage of the difference between the resonant frequency and the reference frequency. For example, the value of the y-axis may be obtained by dividing a value, obtained by subtracting the reference frequency from the measured resonant frequency, by the reference frequency, and multiplying the resultant value by 100. For convenience of description, the value of the y-axis may be named as the resonant frequency variation.

In FIG. 4B, the first graph 411 is the result of measurement of the resonant frequency variation at various points for a first type of wireless power receiving device. The second graph 412 is the result of measurement of the resonant frequency variation at various points for a second type of wireless power receiving device. The third graph 413 is the result of measurement of the resonant frequency variation at various points for a third type of wireless power receiving device. The fourth graph 414 is the result of measurement of the resonant frequency variation at various points for a first type of foreign object (e.g., an aluminum ring). The fifth graph 415 is the result of measurement of the resonant frequency variation at various points for a second type of foreign object (e.g., an aluminum foil). The sixth graph 416 is the result of measurement of the resonant frequency variation at various points for a third type of foreign object (e.g., an iron disk). In the range of –20 mm to 25 mm in FIG. 4B, the values of the y-axis of the graphs 414, 415, and 416 corresponding to the foreign objects are larger than the values of the y-axis of the graphs 411, 412, and 413 corresponding to the wireless power receiving devices and may be relatively clearly distinguished. For example, the threshold may be set to –3 as the y-axis value. If the resonant frequency variation exceeds a threshold (e.g., –3), it may be identified that a foreign object is placed in the charging area. If the resonant frequency variation is less than or equal to the threshold, it may be identified that the wireless power receiving device or both the wireless power receiving device and the foreign object are placed. As shown in FIG. 4B, in the charging area, the difference between the resonant frequency variation corresponding to foreign objects and the resonant frequency variation corresponding to the wireless power receiving device is relatively large. It may be determined whether only a foreign object is placed in the charging area even without communication with the wireless power receiving device 103 based on the resonant frequency variation.

Figure 5A:
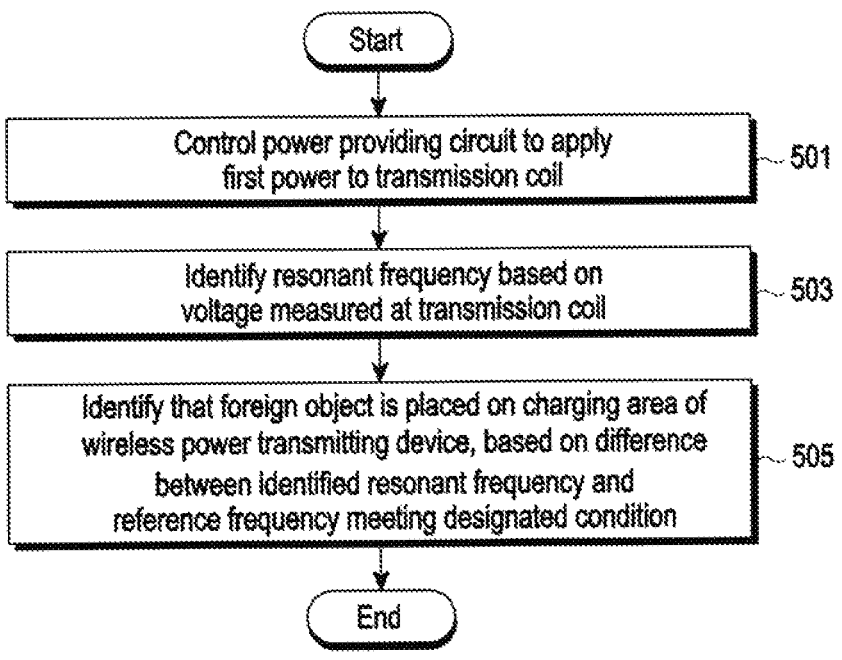
FIG. 5A is a flowchart illustrating a method for operating a wireless power transmitting device according to an embodiment.
Figure 5B:
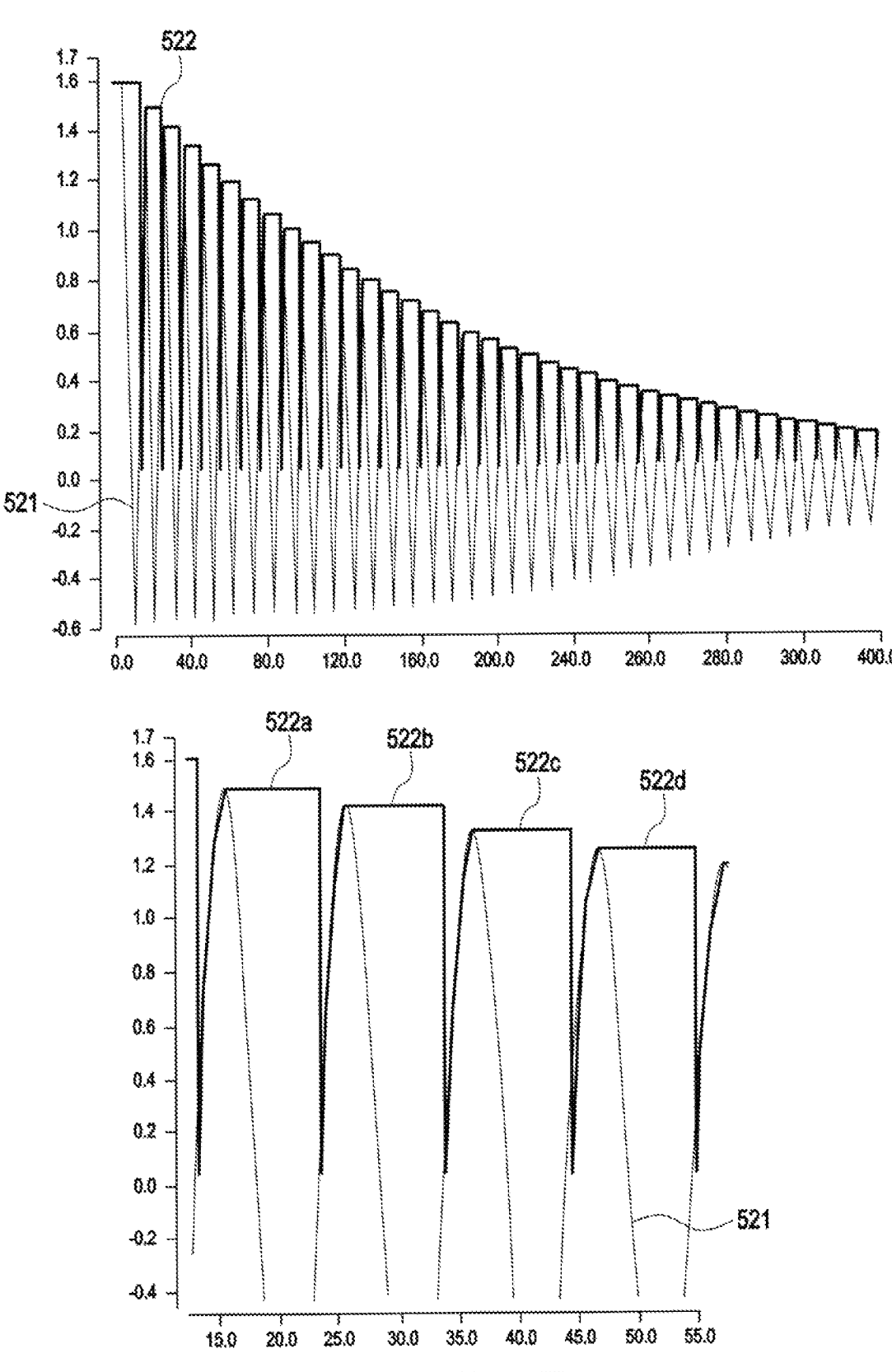
FIG. 5B is a graph illustrating measurement of a resonant frequency according to an embodiment.

FIG. 5A is a flowchart illustrating a method for operating a wireless power transmitting device according to an embodiment. The embodiment of FIG. 5A is described with reference to FIG. 5B. FIG. 5B is graphs illustrating measurement of a resonant frequency according to an embodiment.

According to an embodiment, the wireless power transmitting device 101 (e.g., the controller 215) may control the power providing circuit (e.g., at least one of the DC/DC converter 217 or the inverter 218) to apply first power to the transmission coil 213 in operation 501. For example, the wireless power transmitting device 101 may control the power providing circuit (e.g., at least one of the DC/DC converter 217 or the inverter 218) to apply the first power, such as the ping signal 301, to the transmission coil 213 in the standby phase. Meanwhile, the timing of applying the first power is not limited, and various times of application are described below. In operation 503, the wireless power transmitting device 101 may identify the resonant frequency based on the voltage measured at the transmission coil 213. For example, the wireless power transmitting device 101 may identify the resonant frequency based on the voltage measured at the transmission coil 213 in response to the first power to the transmission coil 213. In an embodiment, as described in connection with FIG. 3, the wireless power transmitting device 101 may identify the resonant frequency based on the voltage measured at the transmission coil 213 during a designated period (e.g., the period for measuring waveform attenuation) after application of the first power stops, but the timing of measurement is not limited. For example, referring to FIG. 5B, the voltage 521 may be applied to the transmission coil 213. The wireless power transmitting device 101 may include, e.g., a waveform and/or frequency detection circuit (envelop and/or frequency detection circuit) (e.g., P9242-R circuit or CPS8100 circuit). The waveform and/or frequency detection circuit may include a pulse counter, a peak detector, and an analog-to-digital converter (ADC), but this is merely an example, and the method of detecting the waveform and/or frequency is not limited. The waveform and/or frequency detection circuit may identify the frequency based on the voltage applied to the transmission coil 213. The waveform and/or frequency detection circuit may identify the voltage applied to the transmission coil 213 and/or the Q-factor based on the voltage. For example, as shown in FIG. 5B, the wireless power transmitting device 101 may sample the voltage 521, applied to the transmission coil 213 after the application of the first power is terminated, with a designated sampling frequency and identify the peak values 522a, 522b, 522c, and 522d based on the sampling result 522. For example, the voltage 521 may have a frequency of 110 kHz to 145 kHz, and the sampling rate may be 8 MHz, but this is an example. The wireless power transmitting device 101 may identify the frequency based on the time interval between adjacent peaks among at least some of the peak values 522a, 522b, 522c, and 522d, but this is exemplary, and the method of identifying the resonant frequency is not limited. As is described below, the wireless power transmitting device 101 may identify the Q-factor based on at least some of the peak values 522a, 522b, 522c, and 522d. For example, the wireless power transmitting device 101 may identify the Q-factor using Equation 1 or Equation 2 and at least some of the peak values 522a, 522b, 522c, and 522d and the times at which the peaks occur, but this is exemplary, and the method of identifying the Q-factor is not limited. For example, Q-factor may be identified based on a frequency sweeping scheme.

According to an embodiment, in operation 505, the wireless power transmitting device 101 may identify that a foreign object is placed on the charging area of the wireless power transmitting device 101 based on the difference between the identified resonant frequency and the reference frequency meeting a designated condition. The wireless power transmitting device 101 may identify the frequency measured when no foreign object is present, a frequency pre-stored in the wireless power transmitting device 101 (e.g., a frequency stored in the memory (not shown) at the time of manufacture), or a frequency identified based on a pre-stored equation, as the reference frequency. The wireless power transmitting device 101 may identify the difference between the identified resonant frequency and the reference frequency. In an example, as shown in FIG. 4B, the wireless power transmitting device 101 may identify the difference by subtracting the reference frequency from the identified resonant frequency, dividing it by the reference frequency, and then multiplying the result by 100, but this is exemplary, and it will be appreciated by one of ordinary skill in the art that the calculation is not limited thereto as long as it includes the difference between the reference frequency and the identified frequency. The designated condition in operation 505 may be, e.g., when the difference (e.g., the resonant frequency variation of FIG. 4B) exceeds a threshold (e.g., –3 of FIG. 4B). As described in connection with FIG. 4B, the difference corresponding to the foreign object (e.g., the resonant frequency variation) may be set to a threshold that may be distinguished from the difference corresponding to the wireless power receiving device (e.g., the resonant frequency variation), but is not limited thereto. The wireless power transmitting device 101 may identify that only a foreign object is placed in the charging area as described above. If only a foreign object is placed in the charging area, the wireless power transmitting device 101 may output an alarm indicating the placement of the foreign object (or an alarm indicating an error), and the type of the alarm is not limited. If only a foreign object is placed in the charging area, the wireless power transmitting device 101 may refrain applying a digital ping signal to the coil, and temperature rise due to the application of the digital ping signal may be suppressed, and the power consumption and/or consumed resources of the wireless power transmitting device 101 may be saved.

Figure 6:
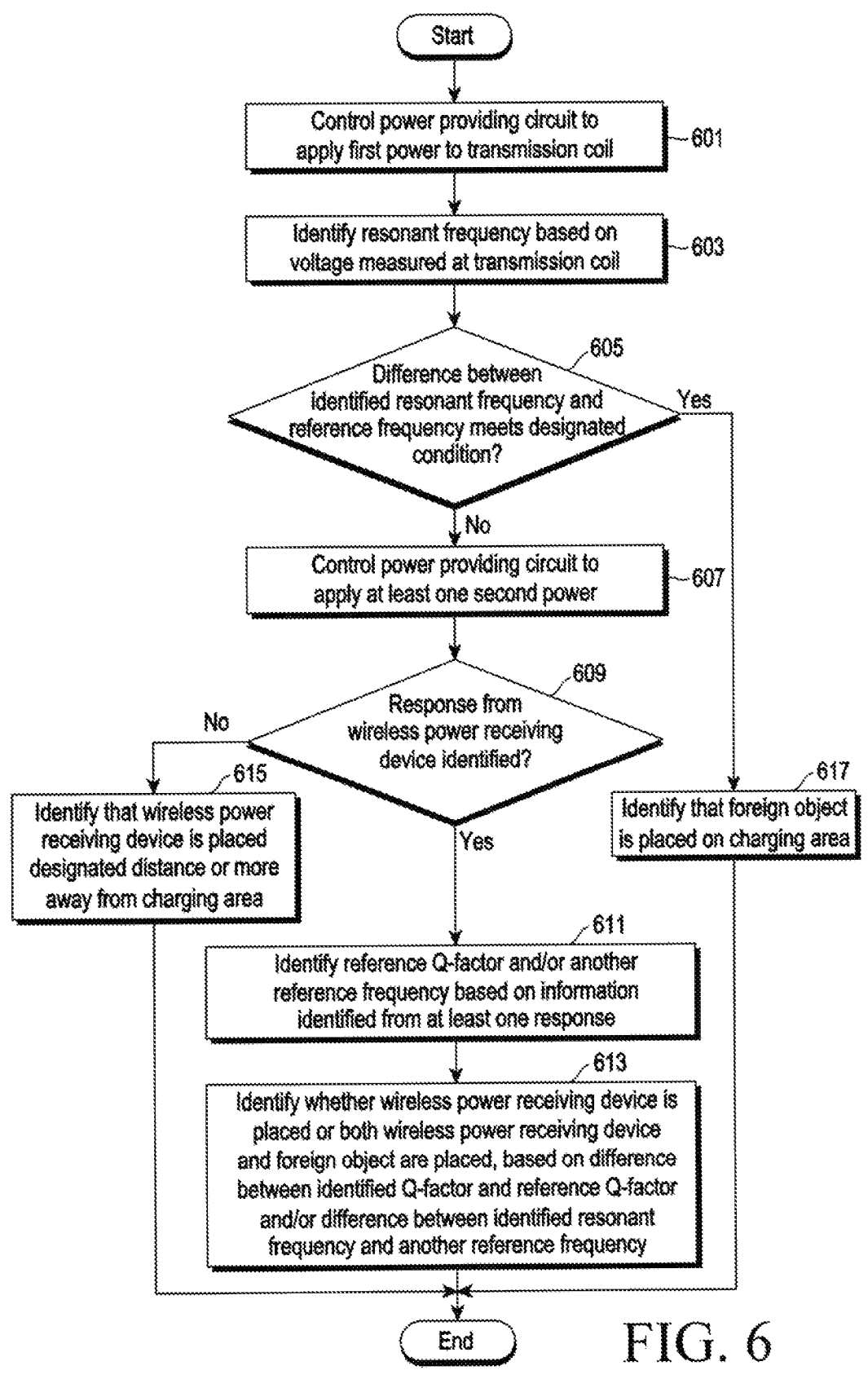
FIG. 6 is a flowchart illustrating a method for operating a wireless power transmitting device according to an embodiment.

FIG. 6 is a flowchart illustrating a method for operating a wireless power transmitting device according to an embodiment.

According to an embodiment, the wireless power transmitting device 101 (e.g., the controller 215) may control the power providing circuit (e.g., at least one of the DC/DC converter 217 or the inverter 218) to apply first power (e.g., Q ping signal) to the transmission coil 213 in operation 601. For example, the wireless power transmitting device 101 may control the power providing circuit (e.g., at least one of the DC/DC converter 217 or the inverter 218) to apply the first power (e.g., Q ping signal) to the transmission coil 213 in the standby phase. In operation 603, the wireless power transmitting device 101 may identify the resonant frequency based on the voltage measured at the transmission coil 213. The method of identifying the resonant frequency and/or the period of the voltage used has been described in connection with FIGS. 5A and 5B, and no further detailed description thereof is given below. In operation 605, the wireless power transmitting device 101 may identify whether the difference between the identified resonant frequency and the reference frequency meets a designated condition. As in the example described in connection with FIG. 5A, the wireless power transmitting device 101 may identify whether the difference (e.g., the resonant frequency variation of FIG. 4B) between the identified resonant frequency and reference frequency exceeds the threshold (e.g., −3 in FIG. 4B).

If the designated condition is identified not to be met (No in 605), the wireless power transmitting device 101 may control the power providing circuit (e.g., at least one of the DC/DC converter 217 or the inverter 218) to apply at least one second power (e.g., D ping signal) in operation 607. In operation 609, the wireless power transmitting device 101 may identify whether a response is received from the wireless power receiving device while the second power is applied (or within a threshold time after the second power is applied). For example, the wireless power transmitting device 101 may identify whether data is received based on demodulation of the voltage applied to the transmission coil 213, filtering, and/or decoding, as discussed above. It will be appreciated by one of ordinary skill in the art that if the wireless power transmitting device 101 supports out-of-band communication, the wireless power transmitting device 101 may identify whether an out-of-band signal is received while the second power is applied. If a response is identified from the wireless power receiving device (Yes in 609), the wireless power transmitting device 101 may identify the reference Q-factor and/or another reference frequency based on information identified from at least one response from the wireless power receiving device 103 in operation 611. Here, the reference Q-factor may be information received from the wireless power receiving device 103 or identified based on the received information, and may be set based on the Q-factor measured when the wireless power receiving device 103 is placed on the charging area, but is not limited thereto. The other reference frequency may be information received from the wireless power receiving device 103 or may be identified based on the received information, or may be set based on the frequency measured when the wireless power receiving device 103 is placed on the charging area, but is not limited thereto. The other reference frequency may be identified based on the information from the wireless power receiving device 103 as described above, and the reference frequency used in operation 605 is a value stored in or measured by the wireless power transmitting device 101 and may thus be different. In operation 613, the wireless power transmitting device 101 may identify whether the wireless power receiving device 103 is placed on the charging area or both the wireless power receiving device 103 and the foreign object are placed on the charging area based on the difference between the Q-factor and reference Q-factor identified in operation 611 and/or the difference between the resonant frequency and the other reference frequency identified in operation 611. For example, if the difference between the Q-factor and reference Q-factor identified in operation 611 exceeds a threshold, the wireless power transmitting device 101 may identify that the wireless power receiving device 103 and the foreign object both are placed on the charging area. For example, if the difference between the Q-factor and reference Q-factor identified in operation 611 is the threshold or less, the wireless power transmitting device 101 may identify that the wireless power receiving device 103 is placed on the charging area without any foreign objects. For example, if the difference between the identified resonant frequency and the other reference frequency in operation 611 exceeds the threshold, the wireless power transmitting device 101 may identify that the wireless power receiving device 103 and the foreign object both are placed on the charging area. For example, if the difference between the resonant frequency and the other reference frequency identified in operation 611 is the threshold or less, the wireless power transmitting device 101 may identify that the wireless power receiving device 103 without any foreign objects is placed on the charging area. Meanwhile, in another example, a reference Q change value may be a substitute for the reference Q-factor and, in this case, the wireless power transmitting device 101 may identify whether only the wireless power receiving device 103 is placed or both the wireless power receiving device 103 and the foreign object are placed based on whether the difference between the Q-factor measured when the wireless power receiving device 103 is placed and the Q-factor measured when the wireless power receiving device 103 is not placed exceeds the reference Q change value. Meanwhile, in another example, a reference frequency change value may be a substitute for the reference frequency and, in this case, the wireless power transmitting device 101 may identify whether only the wireless power receiving device 103 is placed or both the wireless power receiving device 103 and the foreign object are placed based on whether the difference between the frequency measured when the wireless power receiving device 103 is placed and the frequency measured when the wireless power receiving device 103 is not placed exceeds the reference frequency change value.

If it is identified that only the wireless power receiving device 103 is placed, the wireless power transmitting device 101 may perform at least one operation configured for charging. In one example, the wireless power transmitting device 101 may perform subsequent operations defined in the Qi standard, but this is merely an example, and it will be appreciated by one of ordinary skill in the art that an operation of applying power for charging to the transmission coil 213 or any operations defined based on the protocol with the wireless power receiving device before the application of power for charging may be performed without limitation.

If no response is identified from the wireless power receiving device (No in 609), the wireless power transmitting device 101 may identify that the wireless power receiving device 103 is placed a designated distance away from the charging area in operation 615. When the wireless power receiving device 103 (e.g., center point of the wireless power receiving device 103, but not limited thereto) is placed a designated distance or more away from the charging area (e.g., center point of the charging area, but not limited thereto), for convenience of description, this situation may be referred to as misalignment. If the wireless power receiving device 103 is misaligned, the wireless power transmitting device 101 may fail to identify a response from the wireless power receiving device 103. For example, as the distance between the transmission coil 213 included in the wireless power transmitting device 101 and the reception coil 221 included in the wireless power receiving device 103 is relatively large, the variation width of the voltage measured at the transmission coil 213, by the modulation of the wireless power receiving device 103 (e.g., on/off of at least one of the switches 231, 232, 233, and 234) may be small. Accordingly, if the wireless power receiving device 103 is misaligned, the wireless power transmitting device 101 may fail to identify the valid decoding result based on the voltage measured at the transmission coil 213. However, in contrast to the conventional Qi standard in which when the wireless power transmitting device 101 fails to identify a response, it simply determines that a foreign object is placed, according to certain embodiments, the wireless power transmitting device 101 may identify that the wireless power receiving device 103 is placed in the charging are but is misaligned. For example, since the resonant frequency variation indicates the characteristics of the wireless power receiving device (e.g., failing to meet the designated condition in operation 605), but the wireless power transmitting device 101 fails to identify a response, the wireless power transmitting device 101 may identify that the wireless power receiving device 103 is placed in the charging are but is misaligned. If the wireless power receiving device 103 is misaligned, the wireless power transmitting device 101 may output an alarm indicating that the wireless power receiving device 103 is misaligned and, in one example, the alarm may be implemented to be different from the alarm output when a foreign object is placed. Accordingly, the user may recognize that the wireless power receiving device 103 is placed but is too misaligned to be charged, and move the wireless power receiving device 103 to an appropriate position. Meanwhile, in another example, the alarm indicating that the wireless power receiving device 103 is misaligned may be identical to the alarm output when a foreign object is placed. If the designated condition is met (Yes in 605), the wireless power transmitting device 101 may identify that a foreign object is placed in the charging area in operation 617.

In the embodiment of FIG. 6, it has been described that if the wireless power transmitting device 101 identifies that the designated condition is not met (No in 605), the wireless power transmitting device 101 may control the power providing circuit (e.g., at least one of the DC/DC converter 217 or the inverter 218) to apply at least one second power (e.g., D ping signal) in operation 607, but this is exemplary. In another embodiment, after the wireless power transmitting device 101 applies at least one second power, based on the failure to identify a response from the wireless power receiving device, the difference between the measured resonant frequency and the reference frequency is designated. The wireless power transmitting device 101 may also identify whether a condition is met. For example, if it is identified that the difference between the measured resonant frequency and the reference frequency meets a designated condition after failing to identify a response, the wireless power transmitting device 101 may identify that a foreign object is placed in the charging area. For example, if it is identified that the difference between the measured resonant frequency and the reference frequency does not meet the designated condition after failing to identify a response, the wireless power transmitting device 101 may identify that the wireless power receiving device 103 is misaligned. An embodiment of determining whether the difference between the measured resonant frequency and the reference frequency meets the designated condition after a D ping signal is applied is described with reference to FIGS. 7A and 7B.

Figure 7A:
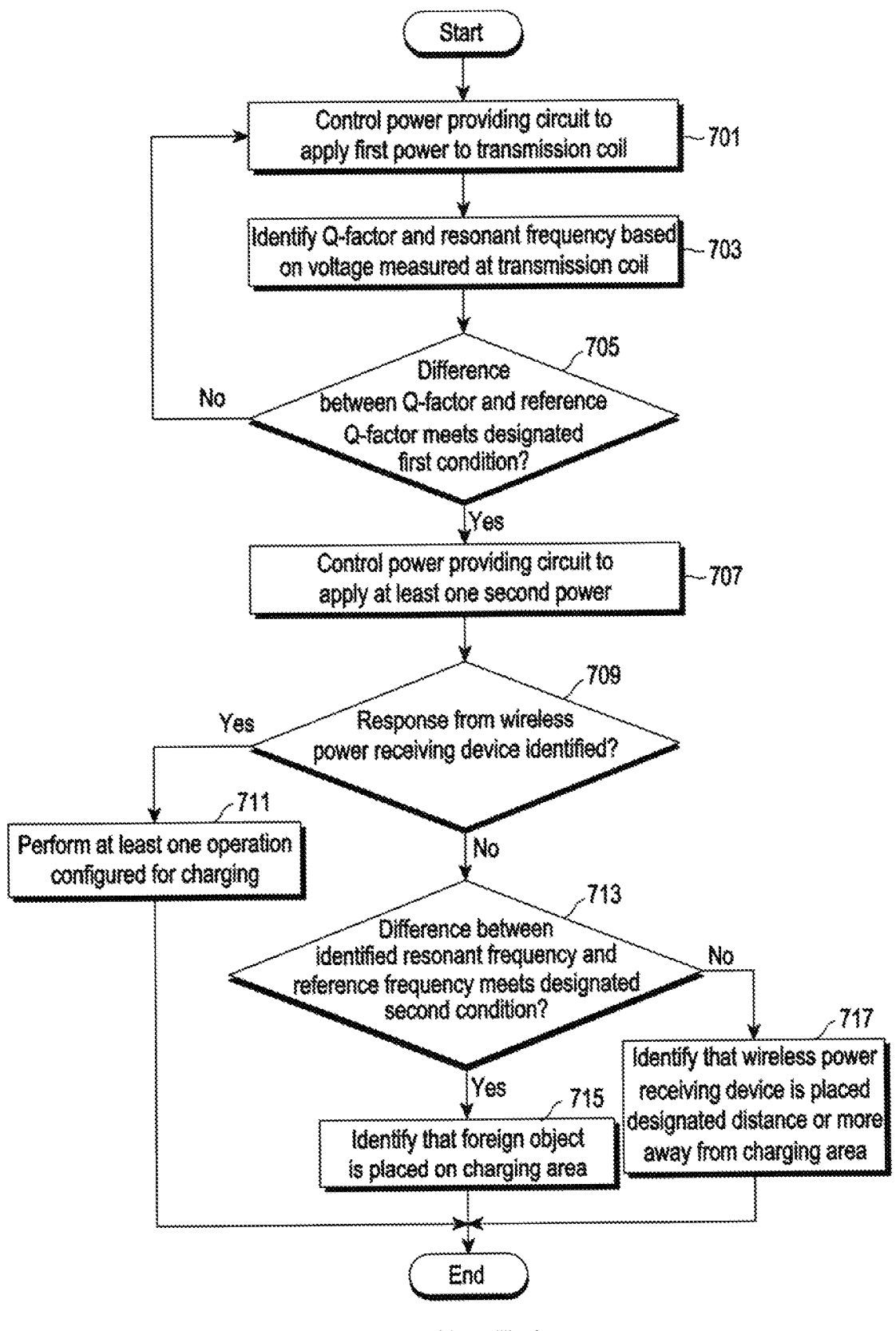
FIG. 7A is a flowchart illustrating a method for operating a wireless power transmitting device according to an embodiment.
Figure 7B:
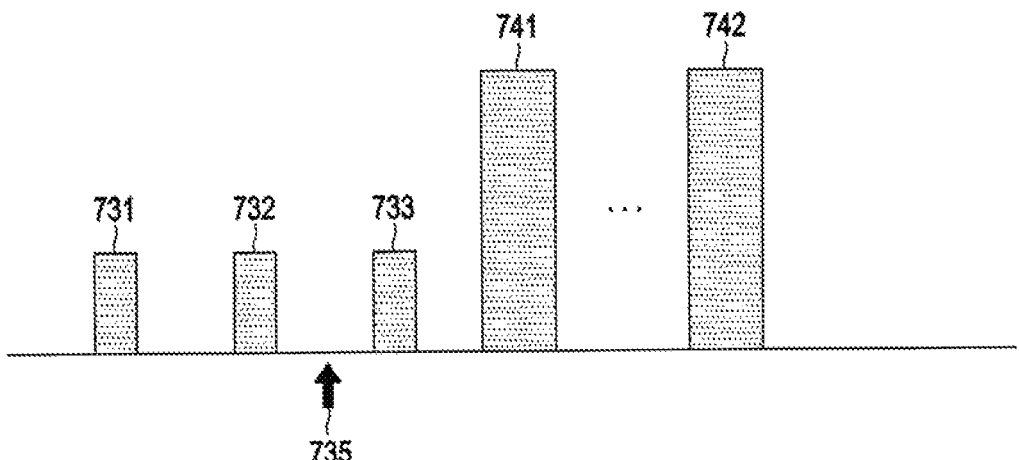
FIG. 7B is a view illustrating power applied to a transmission coil according to an embodiment.

FIG. 7A is a flowchart illustrating a method for operating a wireless power transmitting device according to an embodiment. The embodiment of FIG. 7A is described with reference to FIG. 7B. FIG. 7B is a view illustrating power applied to a transmission coil according to an embodiment.

According to an embodiment, the wireless power transmitting device 101 (e.g., the controller 215) may control the power providing circuit (e.g., at least one of the DC/DC converter 217 or the inverter 218) to apply first power (e.g., the first power 731 of FIG. 7B) (e.g., Q ping signal) to the transmission coil 213 in operation 701. For example, the wireless power transmitting device 101 may control the power providing circuit (e.g., at least one of the DC/DC converter 217 or the inverter 218) to apply the first power (e.g., the first power 731 of FIG. 7B) in the standby phase. In operation 703, the wireless power transmitting device 101 may identify the Q-factor and resonant frequency based on the voltage measured at the transmission coil 213. As described above, the wireless power transmitting device 101 may identify the Q-factor based on the voltage measured after the application of the first power 731 is completed. The period of measurement of the voltage selected to identify the resonant frequency by the wireless power transmitting device 101 is not limited. In operation 705, the wireless power transmitting device 101 may identify whether the difference between the Q-factor and the reference Q-factor meets a designated first condition. Here, the first condition may be that the difference between the Q-factor and the reference Q-factor is a threshold or less, but is not limited. As described in connection with FIG. 4A, it may be identified that the Q-factor is reduced as compared with the reference Q-factor when various types of wireless power receiving devices or various types of foreign objects are placed in the charging area of the wireless power transmitting device 101. The wireless power transmitting device 101 may temporarily determine that the wireless power receiving device or foreign object is placed in the charging area based on the difference between the Q-factor and the reference Q-factor being not more than a threshold that is experimentally determined. Here, the reference Q-factor may be a value measured when the wireless power receiving device or foreign object is not placed in the charging area. The reference Q-factor may be previously stored, or identified by a pre-stored calculation method, and it will be appreciated by one of ordinary skill in the art that the method of setting the reference Q-factor is not limited. If the first condition is not met (No in 705), the wireless power transmitting device 101 may return to operation 701, controlling the power providing circuit (e.g., at least one of the DC/DC converter 217 or the inverter 218) to apply the first power (e.g., the first power 732 of FIG. 7B). FIG. 7B illustrates the case where the wireless power receiving device 103 or foreign object is placed in the charging area at a time 735 after second application of the first power 732. The wireless power transmitting device 101 may control the power providing circuit (e.g., at least one of the DC/DC converter 217 or the inverter 218) to apply the first power (e.g., the first power 733 of FIG. 7B) after the time 735. The wireless power transmitting device 101 may identify that the first condition is met, e.g., the difference between the measured Q-factor and the reference Q-factor is the threshold or less, based on the first power (e.g., the first power 733 of FIG. 7B).

According to an embodiment, if the first condition is met (Yes in 705), the wireless power transmitting device 101 may control the power providing circuit (e.g., at least one of the DC/DC converter 217 or the inverter 218) to apply at least one second power (e.g., the second power 741 and 742 of FIG. 7B) in operation 707. In operation 709, the wireless power transmitting device 101 may identify whether a response is identified from the wireless power receiving device while the second power (e.g., the second power 741 and 742 of FIG. 7B) is applied (or within a threshold time period after the second power is applied). As shown in FIG. 7B, the plurality of second power 741 and 742 is sequentially applied, but this is exemplary. In one example, the wireless power transmitting device 101 fails to identify a response while applying the first second power 741, and after a designated cycle, may apply the second (or Nth, where N is 3 or a larger natural number) second power 742. However, this is exemplary and the wireless power transmitting device 101 may be configured to apply only one second power 741. Meanwhile, the magnitudes of the second powers 741 and 742 are identical in the embodiment of FIG. 7B, but this is also exemplary, and the magnitudes of the second powers 741 and 742 may be implemented to differ, which is described with reference to FIGS. 8A and 8B.

If a response is identified (Yes in 709), according to an embodiment, the wireless power transmitting device 101 may perform at least one operation configured for charging in operation 711. As described above, the at least one operation is not limited as long as it is an operation of applying power for charging to the transmission coil 213 or any operations defined based on a protocol with the wireless power receiving device before application of power for charging. If no response is identified (No in 709), the wireless power transmitting device 101 may identify whether the difference between the identified resonant frequency and the reference frequency meets a designated second condition. If the wireless power transmitting device 101 is configured to apply only one second power, operation 709 may proceed to operation 711 based on identifying that a response is identified after applying one second power or proceed to operation 713 based on no response being identified after application of one second power. Meanwhile, if the wireless power transmitting device 101 is configured to apply a plurality of second powers, operation 709, application of other second powers (e.g., the second power 742 of FIG. 7B) may be repeated a designated number of times based on no response being identified after application of the prior second power (e.g., the first second power 741 of FIG. 7B). If a response is identified while the second power is repeatedly applied a designated number of times, the operation method may proceed to operation 711. If no response is identified even when the second power is repeatedly applied designated number of times, the operation method may proceed to operation 713.

If the second condition is identified to be met (e.g., if the resonant frequency variation of FIG. 4B is identified to exceed a threshold) (Yes in 713), the wireless power transmitting device 101 may identify that a foreign object is placed in the charging area in operation 715. The resonant frequency used in operation 713 may be the resonant frequency identified, e.g., in operation 703, but this is exemplary, and it will be appreciated by one of ordinary skill in the art that according to other embodiments, the wireless power transmitting device 101 may measure the resonant frequency without limitation at any time after the time of performing operation 703. If it is identified that the second condition is not met (e.g., if the resonant frequency variation of FIG. 4B is identified to be the threshold or less) (No in 713), the wireless power transmitting device 101 may identify that the wireless power receiving device is placed a designated distance or more away from the charging area, e.g., misaligned, in operation 717.

Figure 8A:
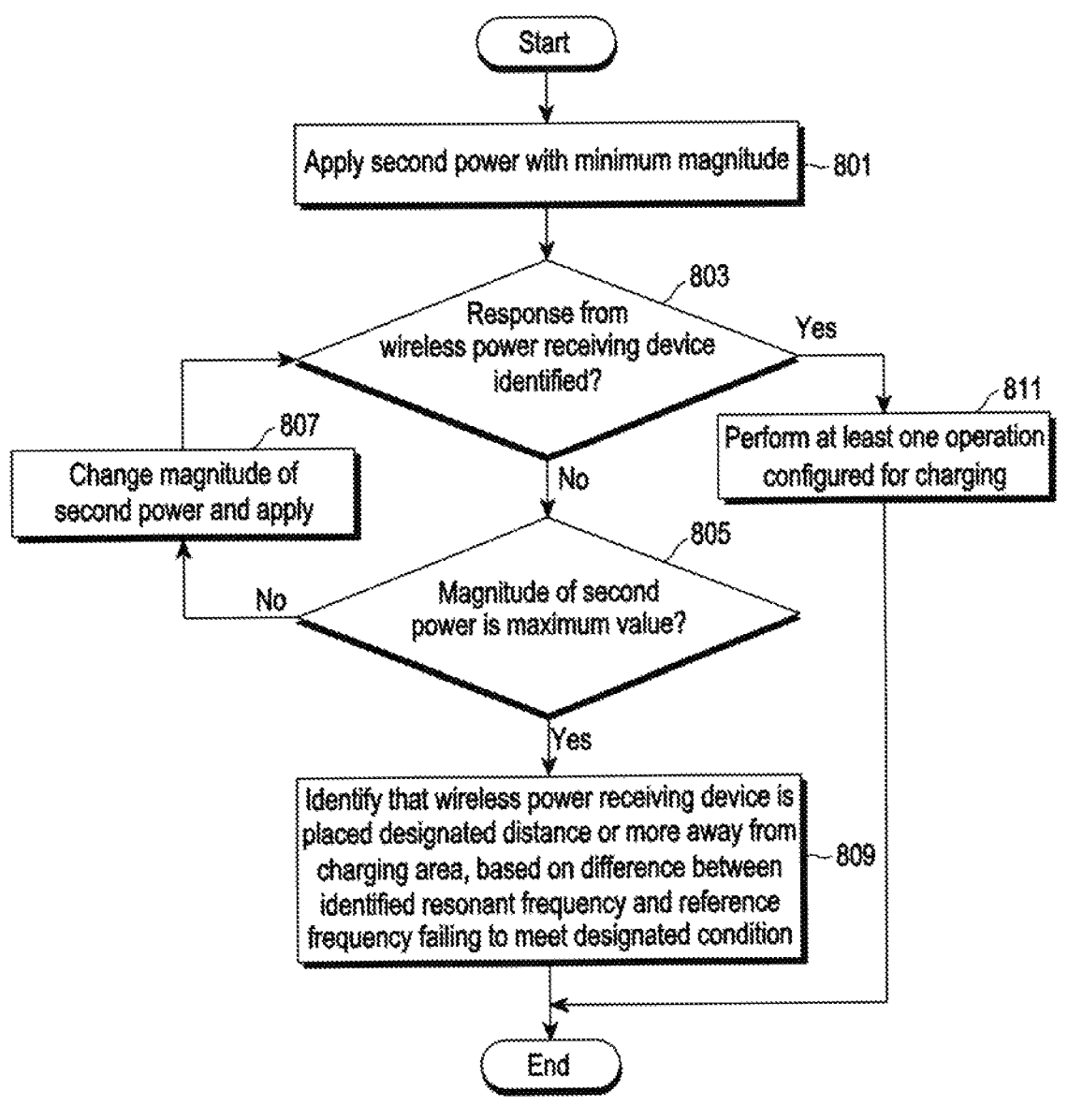
FIG. 8A is a flowchart illustrating a method for operating a wireless power transmitting device according to an embodiment.
Figure 8B:
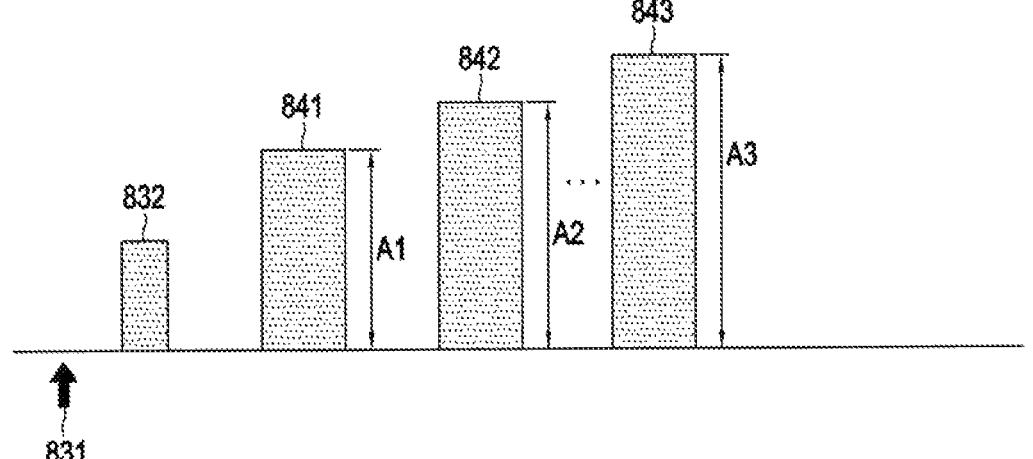
FIG. 8B is a view illustrating power applied to a transmission coil according to an embodiment.

FIG. 8A is a flowchart illustrating a method for operating a wireless power transmitting device according to an embodiment. The embodiment of FIG. 8A is described with reference to FIG. 8B. FIG. 8B is a view illustrating power applied to a transmission coil according to an embodiment.

According to an embodiment, in operation 801, the wireless power transmitting device 101 (e.g., the controller 215) may control the power providing circuit (e.g., at least one of the DC/DC converter 217 or the inverter 218) to apply the second power (e.g., the second power 841 of FIG. 8B) (e.g., D ping signal) with a minimum magnitude to the transmission coil 213. For example, the wireless power transmitting device 101 assumes that the wireless power receiving device 103 or foreign object is placed in the charging area at a time 831 before the second power 841 is applied to the transmission coil 213. The wireless power transmitting device 101 may apply the first power (e.g., the first power 832 of FIG. 8B) (e.g., Q ping signal) after the time 831 of the placement. In one example, the wireless power transmitting device 101 may apply the second power (e.g., the second power 841 of FIG. 8B) based on the difference between the reference frequency and the resonant frequency identified based on the first power (e.g., the first power 832 of FIG. 8B) not meeting a designated condition as shown in FIG. 6A. In another example, the wireless power transmitting device 101 may apply the second power (e.g., the second power 841 of FIG. 8B) based on the difference between the reference Q-factor and the Q-factor identified based on the first power (e.g., the first power 832 of FIG. 8B) meeting a designated condition as shown in FIG. 7A. It is assumed that the first second power 841 has the magnitude of A1. The magnitude of A1 may be associated with, e.g., the magnitude of the driving voltage $V_{DD}$ output from the DC/DC converter 217 and/or the frequency of the inverter 218, but is not limited.

According to an embodiment, in operation 803, the wireless power transmitting device 101 may identify whether a response is identified from the wireless power receiving device. If no response is identified from the wireless power receiving device (No in 803), the wireless power transmitting device 101 may identify whether the magnitude of the second power applied is the maximum value (e.g., A3 in the embodiment of FIG. 8B) in operation 805. If the magnitude of the second power applied is not the maximum value (No in 805), the wireless power transmitting device 101 may control the power providing circuit (e.g., at least one of the DC/DC converter 217 or the inverter 218) to change the magnitude of the second power and apply it to the transmission coil 213 in operation 807. If the magnitude of the second power applied is the maximum value (Yes in 805), the wireless power transmitting device 101 may identify that the wireless power receiving device 103 is placed a designated distance or more away from the charging area based on the difference between the reference frequency and the resonant frequency identified in operation 809 not meeting the designated condition. As described above, the time of determining whether the difference between the reference frequency and the identified resonant frequency does not meet the designated condition is not limited to the examples disclosed herein. Referring to FIG. 8B, upon identifying application of the first second power 841 and failure to identify a response, the wireless power transmitting device 101 may control the power providing circuit (e.g., at least one of the DC/DC converter 217 or the inverter 218) to apply the second power 842 with the changed magnitude A2 to the transmission coil 213 when the magnitude A1 of the applied second power 841 is not the maximum value A3. The wireless power transmitting device 101 may fail to identify a response from the wireless power receiving device even while the second second power 842 is applied, for example. Upon identifying application of the second second power 842 and failure to identify a response, the wireless power transmitting device 101 may control the power providing circuit (e.g., at least one of the DC/DC converter 217 or the inverter 218) to apply the second power 843 with the changed magnitude A3 to the transmission coil 213 when the magnitude A2 of the applied second power 842 is not the maximum value A3. Meanwhile, although FIG. 3 illustrates that the second powers 841, 842, and 843 with three magnitudes A1, A2, and A3 are sequentially applied, this is exemplary, and it will be appreciated by one of ordinary skill in the art that the number of the second powers 841 and 842 (or the number of the magnitudes) is not limited as long as it is two or more. Meanwhile, if the magnitude A3 of the third second power 843 is the maximum value, the wireless power transmitting device 101 may identify that the wireless power receiving device 103 is misaligned based on the difference between the identified resonant frequency and the reference frequency failing to meet the designated condition. It will be appreciated by one of ordinary skill in the art that if the difference between the identified resonant frequency and the reference frequency meets the designated condition, the wireless power transmitting device 101 may determine that a foreign object is placed in the charging area. Meanwhile, if a response is identified from the wireless power receiving device 103 (Yes in 803), the wireless power transmitting device 101 may perform at least one operation configured for charging in operation 811. As described above, a D ping signal with a relatively small magnitude to a D ping signal with a relatively large magnitude may be sequentially applied to the transmission coil 213. If the degree of misalignment is relatively small, although a D ping signal with a relatively small magnitude is applied, a response from the wireless power receiving device 103 may be identified. Thus, as compared with starting off with applying a D ping signal with the maximum value, applying D ping signals with gradually increasing magnitudes may reduce power consumption and reduce heat generated from the wireless power receiving device and/or the foreign object.

Figure 9:
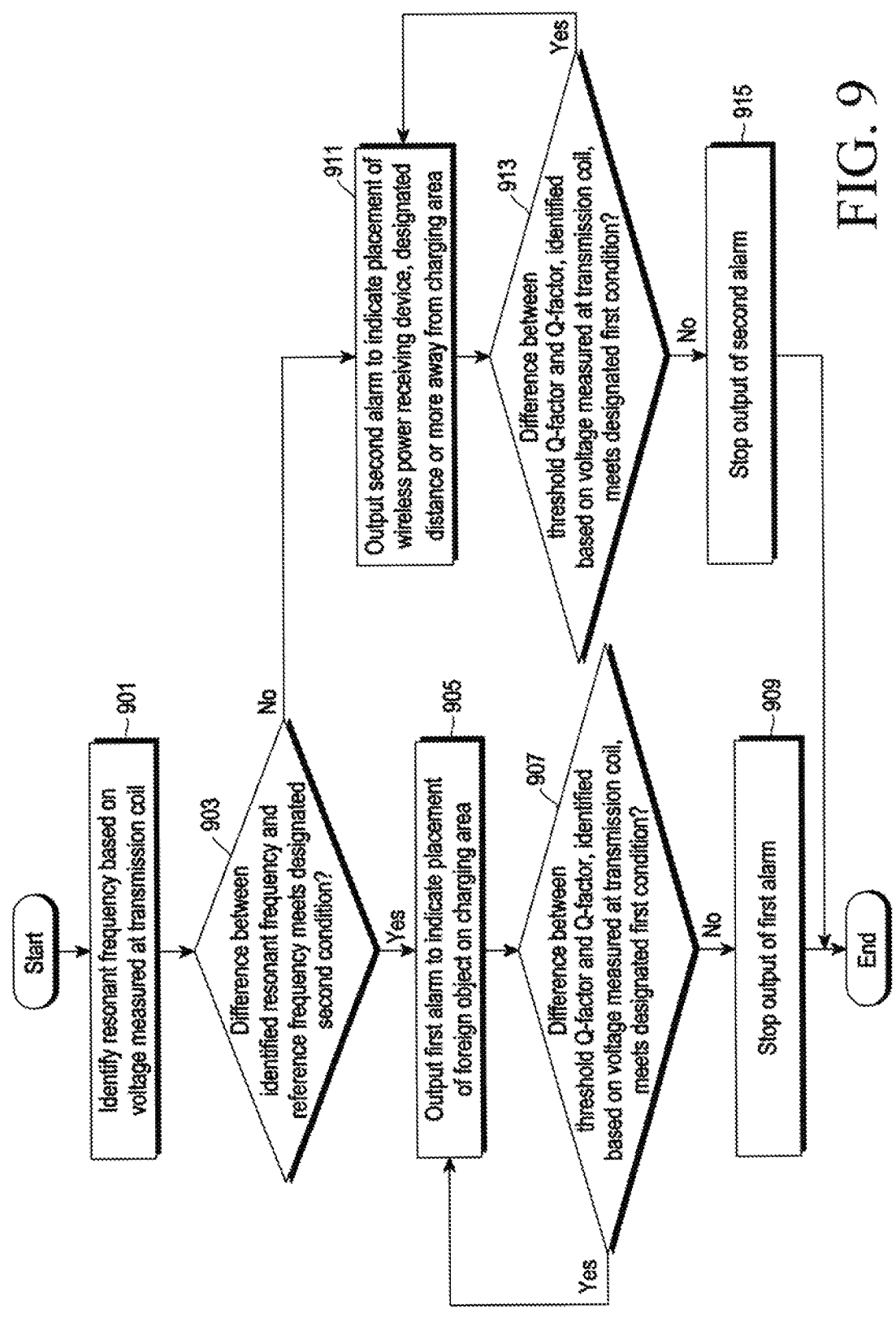
FIG. 9 is a flowchart illustrating a method for operating a wireless power transmitting device according to an embodiment.

FIG. 9 is a flowchart illustrating a method for operating a wireless power transmitting device according to an embodiment.

According to an embodiment, the wireless power transmitting device 101 (e.g., the controller 215) may identify the resonant frequency based on the voltage measured at the transmission coil 213, in operation 901. In operation 903, the wireless power transmitting device 101 may identify whether the difference between the identified resonant frequency and the reference frequency meets a designated second condition. For example, the wireless power transmitting device 101 may identify whether the resonant frequency variation in FIG. 4B exceeds a threshold (e.g., −3) to determine whether the second condition is met. If the difference between the identified resonant frequency and the reference frequency meets the designated second condition (e.g., if the resonant frequency variation in FIG. 4B exceeds the threshold (e.g., −3) in FIG. 4B (Yes in 903), the wireless power transmitting device 101 may output a first alarm to indicate placement of a foreign object in the charging area in operation 905. After outputting the first alarm, the wireless power transmitting device 101 may identify whether the difference between the identified Q-factor and the threshold Q-factor meets the designated first condition based on the voltage measured at the transmission coil in operation 907. For example, the wireless power transmitting device 101 may identify whether the Q-factor variation in FIG. 4A is a threshold (e.g., −50) or less to determine whether the first condition is met. If the difference between the identified Q-factor and the threshold Q-factor meets the first condition (Yes in 907), the wireless power transmitting device 101 may maintain the output of the first alarm. That the difference between the identified Q-factor and the threshold Q-factor meets the first condition means that an object is present in the charging area, so that it may mean that the foreign object is still present in the charging area. The wireless power transmitting device 101 may output the first alarm until the user removes the foreign object. In one example, it will be appreciated by one of ordinary skill in the art that in the context where an error occurs, the wireless power transmitting device 101 may periodically apply the power for Q-factor measurement to the transmission coil 213 and Q-factor may be measured based on power. If the difference between the identified Q-factor and the threshold Q-factor does not meet the first condition (No in 907), the wireless power transmitting device 101 may stop the output of the first alarm in operation 909. That the difference between the identified Q-factor and the threshold Q-factor does not meet the first condition means that no object is present in the charging area, so that it may mean that the foreign object has been removed from the charging area.

Meanwhile, if the difference between the identified resonant frequency and the reference frequency does not meet the designated second condition (e.g., if the resonant frequency variation in FIG. 4B is not more than the threshold (e.g., −3) in FIG. 4B (No in 903), the wireless power transmitting device 101 may output a second alarm to indicate the wireless power receiving device 103 being placed a designated distance or more away from the charging area in operation 911. For example, based on the difference between the identified resonant frequency and the reference frequency failing to meet the designated second condition and failure to identify a response from the wireless power receiving device, the wireless power transmitting device 101 may identify that the wireless power receiving device 103 is misaligned. The second alarm may be implemented to at least partially differ from the first alarm but, in an embodiment, they may be identical to each other. In one example, the second alarm is not limited as long as it is information outputted visually, audibly, and/or tactilely. In one example, the wireless power transmitting device 101 may provide misalignment information, as a communication signal, to the wireless power receiving device 103. For example, the wireless power transmitting device 101 may transmit information indicating the misalignment based on the FSK modulation scheme or output an out-of-band communication signal including the information indicating misalignment. In this case, the wireless power receiving device 103 may output a visual, audible, and/or tactile information representing the misalignment based on the identified information.

According to an embodiment, after outputting the second alarm, the wireless power transmitting device 101 may identify whether the difference between the identified Q-factor and the threshold Q-factor meets the designated first condition based on the voltage measured at the transmission coil in operation 913. If the difference between the identified Q-factor and the threshold Q-factor meets the first condition (Yes in 913), the wireless power transmitting device 101 may maintain the output of the second alarm. That the difference between the identified Q-factor and the threshold Q-factor meets the first condition means that the wireless power receiving device 103 is still misaligned. If the difference between the identified Q-factor and the threshold Q-factor does not meet the first condition (No in 913), the wireless power transmitting device 101 may stop the output of the second alarm in operation 915.

Figure 10:
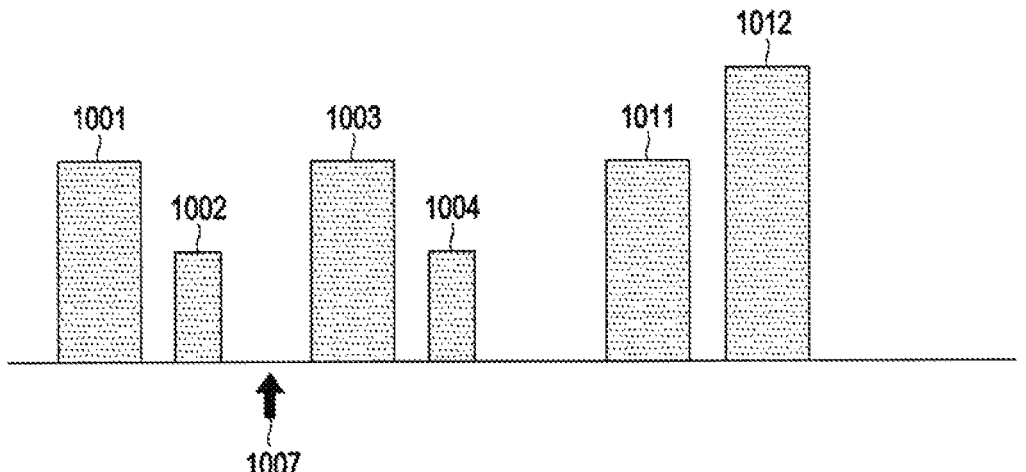
FIG. 10 is a view illustrating power applied to a transmission coil according to an embodiment.

FIG. 10 is a view illustrating power applied to a transmission coil according to an embodiment.

According to an embodiment, the wireless power transmitting device 101 (e.g., the controller 215) may control the power providing circuit (e.g., the DC/DC converter 217 or the inverter 218) to apply first power (e.g., first powers 1002 and 1004 of FIG. 10) after application of second power (e.g., second powers 1001 and 1003 of FIG. 10) (e.g., D ping signal). In the embodiment of FIGS. 7B and 8B, it has been described that the Q ping signal is first applied and, based on a specific event (e.g., meeting the first condition and/or failing to meet the second condition), the D ping signal is then applied. In contrast, in the embodiment of FIG. 10, the wireless power transmitting device 101 may control the power providing circuit (e.g., the DC/DC converter 217 or the inverter 218) to sequentially apply pairs of the D ping signal (e.g., the second powers 1001 and 1003 of FIG. 10) and the Q ping signal (e.g., the first powers 1002 and 1004) to the transmission coil 213. If the wireless power receiving device or foreign object is placed in the charging area at the time 1007, the wireless power transmitting device 101 may identify that the Q-factor variation meets the first condition and/or the resonant frequency variation fails to meet the second condition based on application of the first power 1004. Based on meeting the first condition and/or failing to meet the second condition, the wireless power transmitting device 101 may control the power providing circuit (e.g., the DC/DC converter 217 or the inverter 218) to apply a D ping signal (e.g., the second power 1011 of FIG. 10) to the transmission coil 213. Meanwhile, if the second power 1011 is applied based on an event (e.g., identifying meeting the first condition and/or failing to meet the second condition), the wireless power transmitting device 101 may refrain from application of the first power after the second power 1011 is applied. The wireless power transmitting device 101 may identify whether a response is identified from the wireless power receiving device during the period of applying the second power 1011. If a response is identified, the wireless power transmitting device 101 may perform at least one operation configured for charging. If no response is identified, the wireless power transmitting device 101 may control the power providing circuit (e.g., the DC/DC converter 217 or the inverter 218) to apply another second power 1012 to the transmission coil 213 as shown in FIG. 10. Although FIG. 10 illustrates that the magnitude of the second power 1012 differs from the magnitude of the second power 1011, it will be appreciated by one of ordinary skill in the art that it is exemplary, and the magnitudes may be implemented to be identical to or different from each other. Further, although FIG. 10 illustrates that two second powers 1011 and 1012 are applied to the transmission coil 213, this is exemplary, and the number of second power applied to the transmission coil 213 may be three or more, and in another example, the number may be one. The wireless power transmitting device 101 may identify whether a response is identified from the wireless power receiving device during the period of applying the second power 1012. If a response is identified, the wireless power transmitting device 101 may perform at least one operation configured for charging. If no response is identified, based on the magnitude of the second power 1012 being the maximum value, the wireless power transmitting device 101 may identify that a foreign object is placed in the charging area or identify that the wireless power receiving device 103 is misaligned. For example, as explained above, based on whether the difference between the reference frequency and resonant frequency identified based on the voltage of the transmission coil 213 measured while the first power 1004 (or other power) is applied, it may be identified that a foreign object is placed in the charging area or the wireless power receiving device 103 is misaligned.

Figure 11:
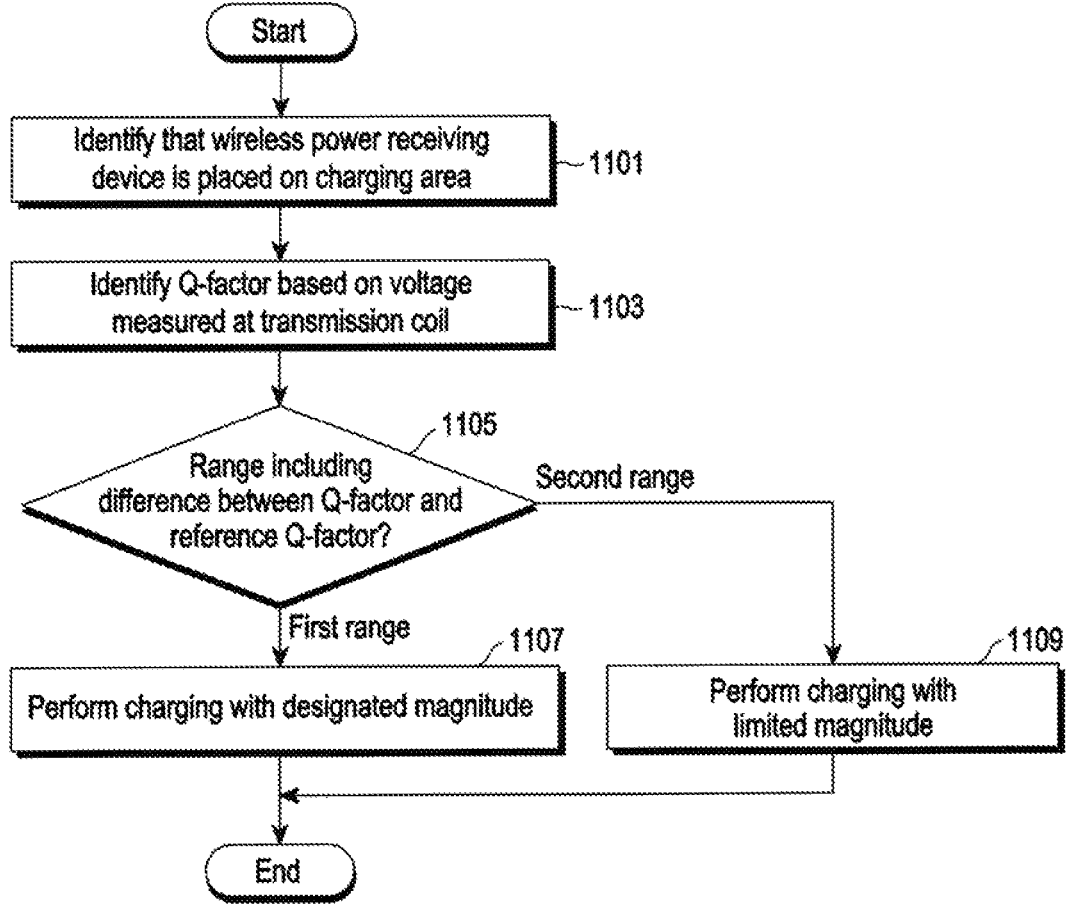
FIG. 11 is a flowchart illustrating a method for operating a wireless power transmitting device according to another embodiment.

FIG. 11 is a flowchart illustrating a method for operating a wireless power transmitting device according to an embodiment.

According to an embodiment, the wireless power transmitting device 101 (e.g., the controller 215) may identify that the wireless power receiving device 103 is placed in the charging area in operation 1101. In one example, the wireless power transmitting device 101 may control the power providing circuit (e.g., at least one of the DC/DC converter 217 or the inverter 218) to apply a D ping signal to the transmission coil 213. The wireless power transmitting device 101 may identify a response from the wireless power receiving device 103 while applying the D ping signal and identify that the wireless power receiving device 103 is placed in the charging area based on identifying a response. In operation 1103, the wireless power transmitting device 101 may identify the Q-factor based on the voltage measured at the transmission coil 213. In one example, the wireless power transmitting device 101 may stop providing the D ping signal or power for communication and may apply a Q ping signal. The wireless power transmitting device 101 may identify the Q-factor based on the voltage measured at the transmission coil 213 after stopping application of the Q ping signal. Because the reference Q-factor has been described above, no description thereof is given below. Meanwhile, in another example, the wireless power transmitting device 101 may use the Q-factor that has been measured before applying the D ping signal.

According to an embodiment, the wireless power transmitting device 101 (e.g., the controller 215) may identify the range including the difference between the identified Q-factor and the reference Q-factor in operation 1105. For example, the range may be previously stored in the wireless power transmitting device 101 or may be divided based on a pre-stored value. For example, a first range may be a range exceeding a second threshold. For example, a second range may be a range exceeding a first threshold smaller than the second threshold and not more than the second threshold. At least one of the first threshold, second threshold, the first range, or the second range may be stored in the wireless power transmitting device 101. The first threshold and the second threshold may be values determined experimentally. For example, various types of wireless power receiving devices and various types of foreign objects may be placed in various positions in the charging area, and experiments for measuring the difference between the Q-factor and the reference Q-factor may be performed. As is described in greater detail with reference to FIG. 12, the difference between the Q-factor and reference Q-factor may be measured depending on at least one of the type of the wireless power receiving device, the type of the foreign object, or the position on the charging area. Accordingly, if the difference between the Q-factor and the reference Q-factor is a specific value, it may be in a state where the foreign object is placed together with the wireless power receiving device or in a state where only the wireless power receiving device is placed. However, when the difference between the Q-factor and the reference Q-factor is a specific value, if it is determined that a foreign object is disposed, so that charging does not proceed, such an occasion may arise in which charging may not be performed even when no foreign object is really placed. The first range may be a range experimentally set, e.g., so that the wireless power receiving device is placed without a foreign object, and the possibility of placement of a foreign object (or frequency according to a result of experiment) meets a designated condition. That the difference between the Q-factor and the reference Q-factor is included in the first range may indicate that the possibility that a foreign object is to be placed along with the wireless power receiving device is relatively low. The second range may be a range experimentally set so that the possibility that the wireless power receiving device and foreign object both are to be placed (or frequency according to a result of experiment) and the possibility that only the wireless power receiving device is to be placed without a foreign object (or frequency according to a result of experiment) meet a designated condition. That the difference between the Q-factor and the reference Q-factor is included in the second range may indicate that the possibility that the foreign object is to be placed together with the wireless power receiving device and the possibility that only the wireless power receiving device is to be placed without the foreign object are relatively similar. Examples of the first range and the second range are described with reference to FIG. 12.

According to an embodiment, in operation 1105, if the range including the difference between the identified Q-factor and the reference Q-factor is determined to be the first range, the wireless power transmitting device 101 may perform charging with a designated magnitude of power in operation 1107. The magnitude may mean, e.g., the amplitude of the power (or current or voltage) applied to the transmission coil 213. Here, the designated magnitude is a magnitude determined based on the information from the wireless power receiving device 103 and may follow, e.g., the magnitude determination scheme of the Qi standard, but is not limited thereto. Here, charging with the designated magnitude of power may be referred to as normal charging for convenience of description. In operation 1105, if the range including the difference between the identified Q-factor and the reference Q-factor is determined to be the second range, the wireless power transmitting device 101 may perform charging with a limited magnitude of power in operation 1109. The limited magnitude is not limited as long as it is, e.g., a magnitude smaller than the designated magnitude in operation 1107. As charging with a limited magnitude of charging power is performed, although a foreign object is present along with the wireless power receiving device, the heat generation may be small as compared with normal charging, and the likelihood that an over-heat situation is to occur may reduce.

According to an embodiment, the wireless power transmitting device 101 may monitor the temperature of at least one point of the wireless power transmitting device 101 while performing charging with a limited magnitude of power. If the temperature is a threshold temperature or more, the temperature increases, or the increase rate of temperature is a threshold increase rate or more, the wireless power transmitting device 101 may further reduce the limited magnitude or stop charging. If the temperature is the threshold temperature or less, the temperature decreases, or the increase rate of temperature is the threshold increase rate or less, the wireless power transmitting device 101 may further increase the limited magnitude or perform normal charging. Meanwhile, according to another embodiment, the wireless power transmitting device 101 may perform normal charging instead of performing charging with the limited magnitude of power of operation 1109 (or perform charging with the limited magnitude of power in another embodiment). The wireless power transmitting device 101 may monitor the temperature while performing normal charging and adjust the magnitude of power depending on the result of monitoring. If the temperature is a threshold temperature or more, the temperature increases, or the increase rate of temperature is a threshold increase rate or more, the wireless power transmitting device 101 may reduce the designated magnitude or stop charging. If the temperature is the threshold temperature or less, the temperature decreases, or the increase rate of temperature is the threshold increase rate or less, the wireless power transmitting device 101 may maintain normal charging with the designated magnitude of power. Meanwhile, the embodiment of FIG. 11 may be performed at any time after the standby phase but, according to an implementation, it may also be performed in the standby phase.

Figure 12:
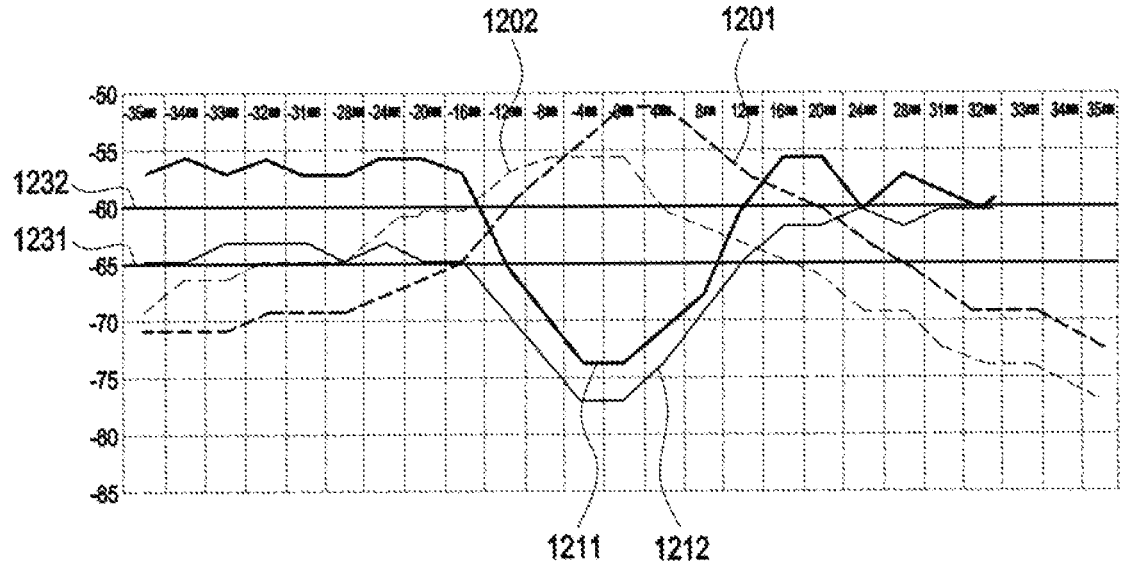
FIG. 12 is a view illustrating a result of experimenting with a change in Q-factor measured when a plurality of types of wireless power receiving devices and a plurality of types of foreign objects are placed.

FIG. 12 is a view illustrating a result of experimenting with a change in Q-factor measured when a plurality of types of wireless power receiving devices and a plurality of types of foreign objects are placed.

As described in connection with FIG. 4A, the x axis may denote the distance in two-dimensions with respect to one point (e.g., a center point) of the charging area of the wireless power transmitting device 101. The y-axis may denote the percentage of the difference between the measured Q-factor and the reference Q-factor. For example, the value of the y-axis may be a value obtained by dividing a value obtained by subtracting the reference Q-factor from the measured Q-factor, by the reference Q-factor, and multiplying the resultant value by 100. For convenience of description, the value of the y-axis may be named as the Q-factor variation.

In FIG. 12, the first graph 1201 is the result of measurement of the Q-factor variation at various points for a first type of wireless power receiving device. The second graph 1202 is the result of measurement of the Q-factor variation at various points for a second type of wireless power receiving device. The third graph 1211 is the result of measurement of the Q-factor variation at various points when the first type of wireless power receiving device and foreign object both are positioned. The fourth graph 1212 is the result of measurement of the Q-factor variation at various points when the second type of wireless power receiving device and foreign object both are positioned. For example, in the range of –8 mm to 4 mm, when the wireless power receiving device is placed (e.g., the first graph 1201 and the second graph 1202), the Q-factor variation may exceed the first threshold 1231, and when both the wireless power receiving device and foreign object are placed (e.g., the third graph 1211 and the fourth graph 1212), the Q-factor variation may be the first threshold 1231 or less. However, it may be identified that in the range of 8 mm to 12 mm, when both the wireless power receiving device and foreign object are placed (e.g., the third graph 1211 and the fourth graph 1212), the Q-factor variation exceeds the first threshold 1231. If whether the foreign object is placed is determined only with one threshold, i.e., the first threshold 1231, even when the wireless power receiving device 103 is slightly misaligned (e.g., even when it is placed within the range of 8 mm to 12 mm), charging may be stopped and, in such a case, the charging area may be set to be relatively narrow. Accordingly, as described in connection with FIG. 11, another threshold (e.g., the second threshold 1232) may be further set. In a range (e.g., the second range described in connection with FIG. 11) more than the first threshold 1231 and not more than the second threshold 1232, it may be when the wireless power receiving device is placed (e.g., the y value at 6 mm in the second graph 1202) or when both the wireless power receiving device and foreign object are placed (e.g., the values at 8 mm to 12 mm in the third graph 1211 and the fourth graph 1212). Accordingly, as described in connection with FIG. 11, the wireless power transmitting device 101 may perform charging with the limited magnitude in the second range. Meanwhile, in the first threshold 1231 or less, the possibility that the foreign object is to be placed together with the wireless power receiving device is relatively high so that the wireless power transmitting device 101 may determine that the foreign object is placed. This is described with reference to FIG. 13.

Figure 13:
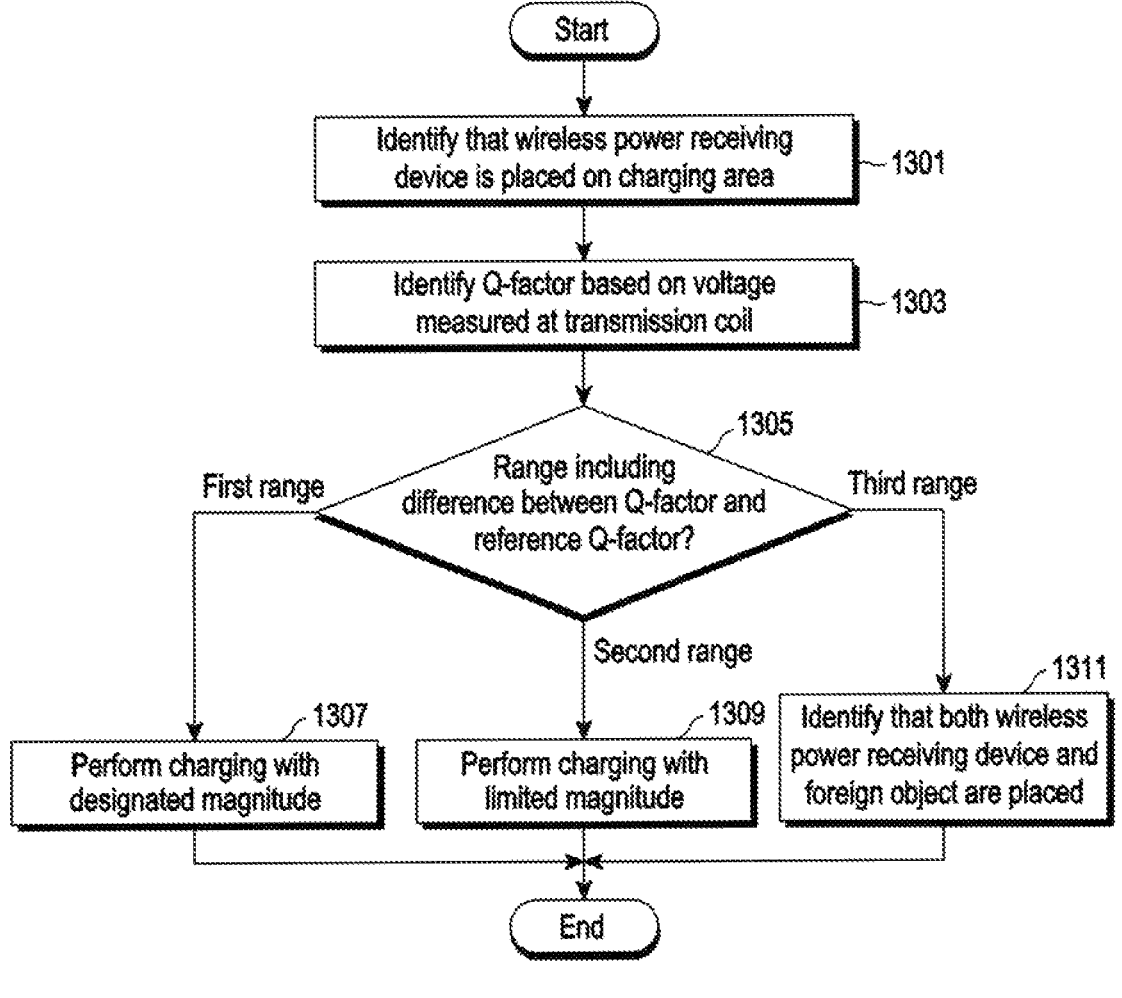
FIG. 13 is a flowchart illustrating a method for operating a wireless power transmitting device according to an embodiment.

FIG. 13 is a flowchart illustrating a method for operating a wireless power transmitting device according to an embodiment. Among the operations of the embodiment of FIG. 13, those described above in connection with FIG. 11 are briefly described.

According to an embodiment, the wireless power transmitting device 101 (e.g., the controller 215) may identify that the wireless power receiving device 103 is placed in the charging area in operation 1301. In operation 1303, the wireless power transmitting device 101 may identify the Q-factor based on the voltage measured at the transmission coil 213. The wireless power transmitting device 101 (e.g., the controller 215) may identify the range including the difference between the identified Q-factor and the reference Q-factor in operation 1305. As described in connection with FIG. 11, in operation 1305, if the range including the difference between the identified Q-factor and the reference Q-factor is determined to be the first range, the wireless power transmitting device 101 may perform charging with a designated magnitude of power in operation 1307. If the range including the difference between the identified Q-factor and the reference Q-factor is determined to be the second range, the wireless power transmitting device 101 may perform charging with a limited magnitude of power in operation 1309. If the range including the difference between the identified Q-factor and the reference Q-factor is determined to be the third range, the wireless power transmitting device 101 may identify that the foreign object together with the wireless power receiving device 103 is placed in the charging area in operation 1311. For example, the third range may be a range not more than the first threshold (e.g., the first threshold 1231 of FIG. 12) described in connection with FIG. 11. As described above, the second range may be a range indicating that the possibility that only the wireless power receiving device 103 is to be placed in the charging area of the wireless power transmitting device 101 and the possibility that the wireless power receiving device 103 and the foreign object both are placed. Meanwhile, if the difference between the identified Q-factor and the reference Q-factor is relatively large (e.g., the first threshold or less), this may mean that the possibility that the foreign object is to be placed in the charging area is relatively higher than the possibility that the wireless power receiving device 103 is placed in the charging area. Accordingly, if the range including the difference between the identified Q-factor and the reference Q-factor is determined to be the third range, the wireless power transmitting device 101 may identify that the foreign object together with the wireless power receiving device 103 is placed in the charging area and provide an alarm. Meanwhile, the embodiment of FIG. 13 may be performed at any time after the standby phase but, according to an implementation, it may also be performed in the standby phase.

Figure 14A:
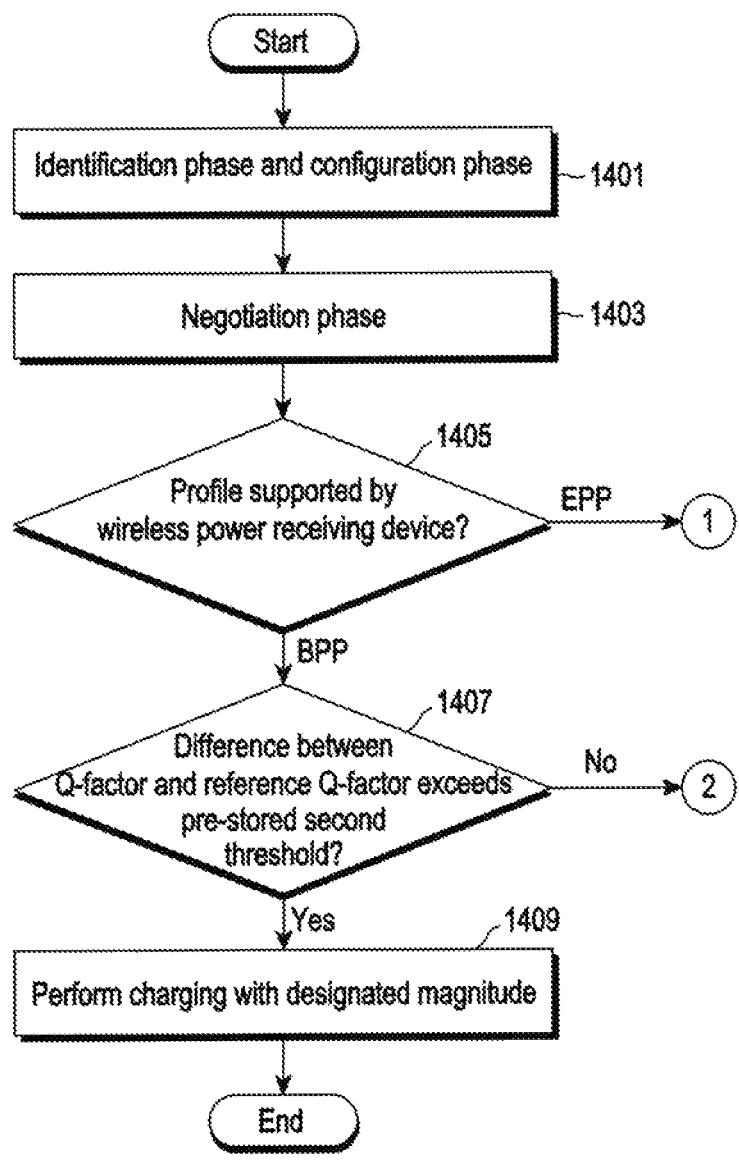
FIGS. 14A and 14B are flowcharts illustrating a method for operating a wireless power transmitting device according to an embodiment.
Figure 14B:
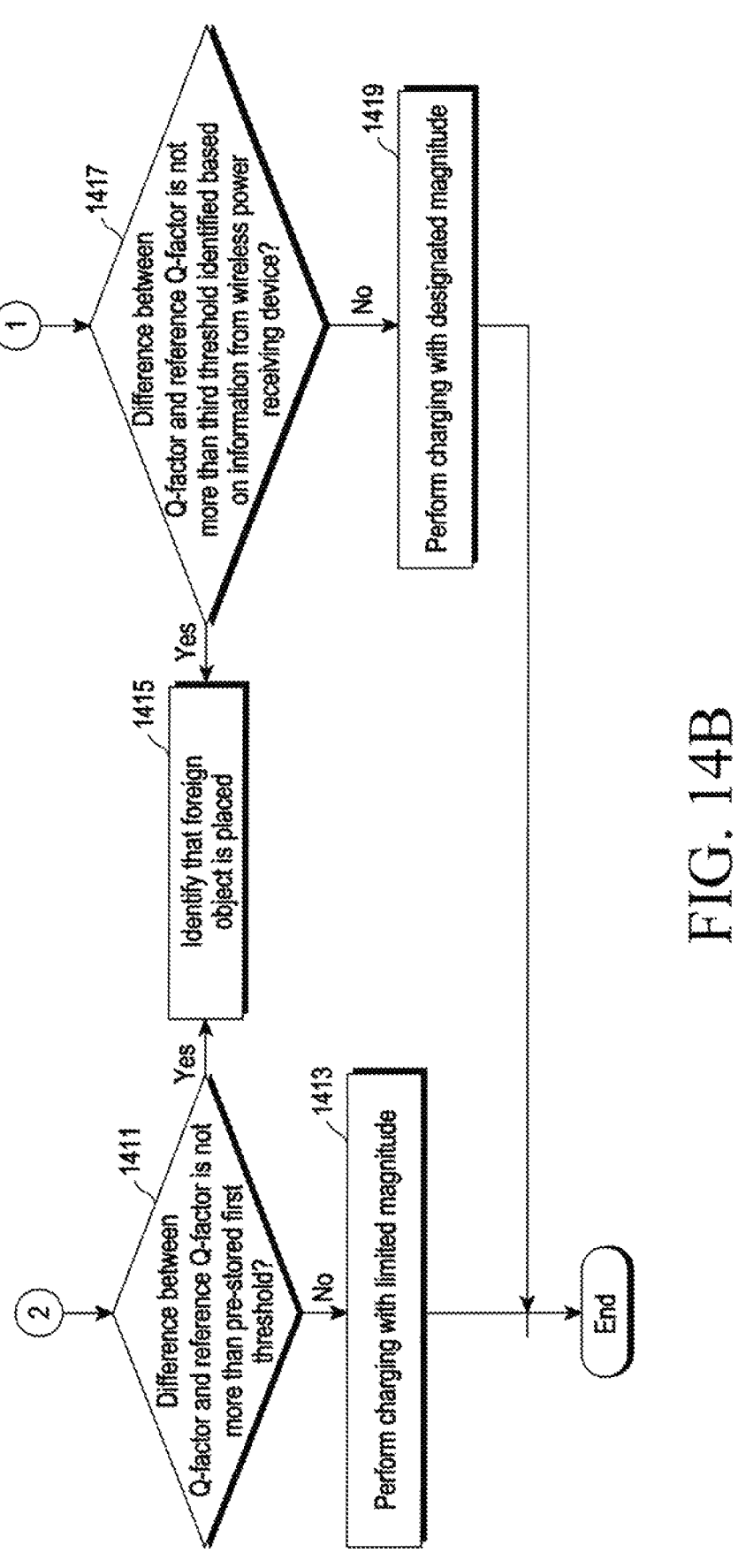

FIGS. 14A and 14B are flowcharts illustrating a method for operating a wireless power transmitting device according to an embodiment.

According to an embodiment, the wireless power transmitting device 101 (e.g., the controller 215) may enter the identification phase and configuration phase described in connection with FIG. 3 in operation 1401. After the identification and the configuration phase, the wireless power transmitting device 101 may enter a negotiation state, in operation 1403. The wireless power transmitting device 101 may identify the type of the profile supported by the wireless power receiving device 103. If the profile supported by the wireless power receiving device is a baseline power profile, the wireless power transmitting device 101 may identify whether the difference between the Q-factor and the reference Q-factor exceeds the second threshold previously stored in the wireless power transmitting device 101 in operation 1407. The second threshold may be a threshold for dividing the first range described based on at least one of FIG. 11, FIG. 12, or FIG. 13, and more than the second threshold may be a range indicating that only the wireless power receiving device 103, without the foreign object, is placed in the charging area of the wireless power transmitting device 101. If the difference between the Q-factor and the reference Q-factor exceeds the second threshold (Yes in 1407), the wireless power transmitting device 101 may perform charging with a designated magnitude of power in operation 1409. For example, the wireless power transmitting device 101 may perform normal charging.

If the difference between the Q-factor and reference Q-factor is the second threshold or less (No in 1407), the wireless power transmitting device 101 according to an embodiment may identify whether the difference between the Q-factor and reference Q-factor is the pre-stored first threshold or more in operation 1411. The first threshold may be a threshold for dividing the second range described based on at least one of FIG. 11, FIG. 12, or FIG. 13, and the range more than the first threshold and not more than the second threshold may be a range indicating that the possibility that only the wireless power receiving device 103 is to be placed in the charging area of the wireless power transmitting device 101 and the possibility that both the wireless power receiving device 103 and foreign object are placed. If the difference between the Q-factor and reference Q-factor exceeds the pre-stored first threshold (No in 1411), the wireless power transmitting device 101 may perform charging with the limited magnitude of power in operation 1413. As described above, the wireless power transmitting device 101 may perform charging with the limited magnitude of power as the difference between the Q-factor and reference Q-factor is more than the first threshold and not more than the second threshold. If the difference between the Q-factor and reference Q-factor is the pre-stored first threshold or less (Yes in 1411), the wireless power transmitting device 101 may identify that the foreign object is placed and stop operation for further charging in operation 1415. For example, as described above, the wireless power transmitting device 101 may determine whether the object placed in the charging area is removed based on periodic application of a Q ping signal and measurement of Q-factor and/or resonant frequency.

If the profile supported by the wireless power receiving device 103 is an extended power profile, the wireless power transmitting device 101 may identify whether the difference between the Q-factor and the Q-factor identified based on the information from the wireless power receiving device 103 exceeds the third threshold in operation 1417. Here, the third threshold may be a value independent from the first threshold and/or second threshold. For example, it may be identified based on the information provided by the wireless power receiving device 103. Meanwhile, in another example, operation 1417 may be replaced with the operation in which the wireless power transmitting device 101 determines whether the difference between the Q-factors before and after the wireless power receiving device 103 is placed exceeds the difference from the reference Q-factor identified based on the information from the wireless power receiving device 103. If the difference between the Q-factor and reference Q-factor is the third threshold or less, the wireless power transmitting device 101 may identify that the foreign object is placed and stops operation for further charging in operation 1415. For example, as described above, the wireless power transmitting device 101 may determine whether the object placed in the charging area is removed based on periodic application of a Q ping signal and measurement of Q-factor and/or resonant frequency. If the difference between the Q-factor and reference Q-factor exceeds the third threshold (No in 1417), the wireless power transmitting device 101 may perform charging with the designated magnitude of power in operation 1419. Meanwhile, the embodiment of FIG. 14 may be performed at any time after the standby phase but, according to an implementation, it may also be performed in the standby phase.

Figure 15:
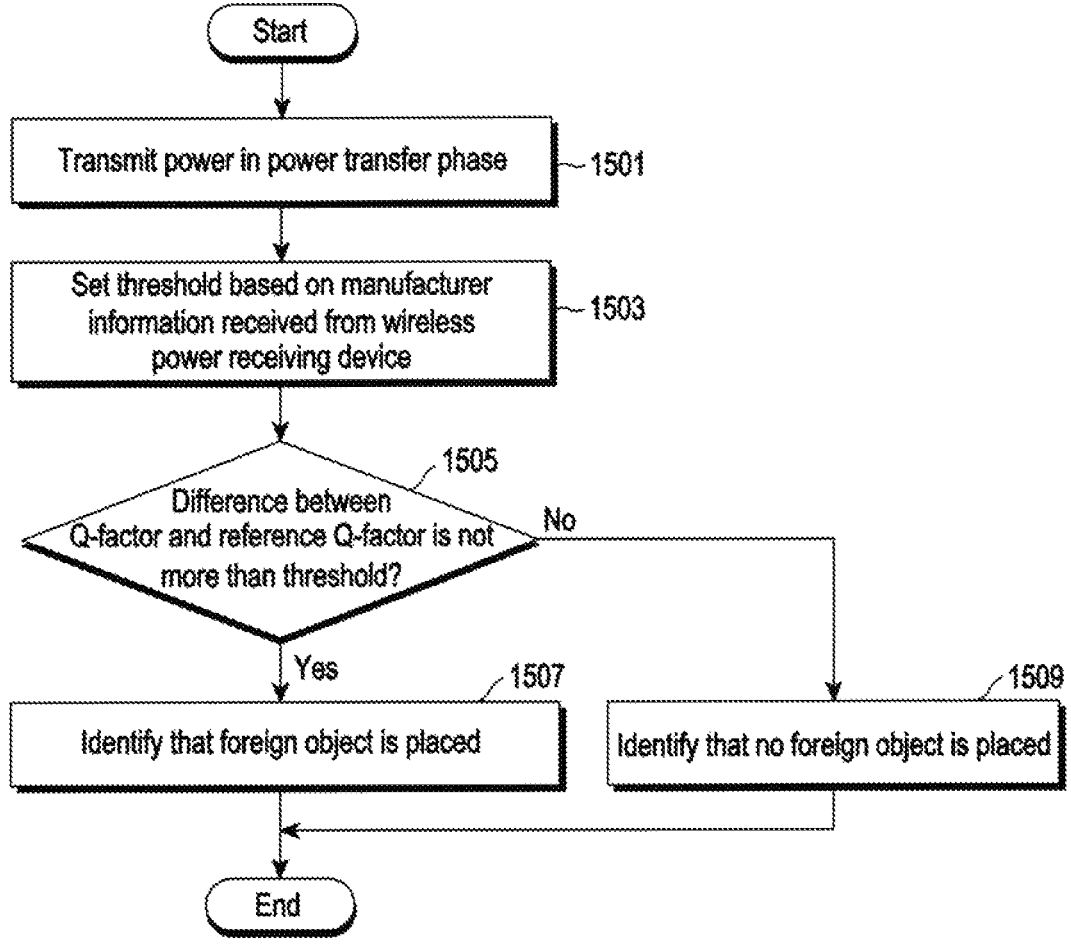
FIG. 15 is a flowchart illustrating a method for operating a wireless power transmitting device according to an embodiment.

FIG. 15 is a flowchart illustrating a method for operating a wireless power transmitting device according to an embodiment.

According to an embodiment, the wireless power transmitting device 101 (e.g., the controller 215) may transmit power in the power transfer phase described in connection with FIG. 3, in operation 1501. In operation 1503, the wireless power transmitting device 101 may set a threshold based on manufacturer information received from the wireless power receiving device 103. For example, the wireless power receiving device 103 may transmit the power receiving device manufacturer codes ("PRMC") defined in the Qi standard, as the manufacturer information, to the wireless power transmitting device 101. The PRMC may be provided from the wireless power receiving device 103 to the wireless power transmitting device 101, e.g., in the identification phase and configuration phase. The wireless power transmitting device 101 may store, e.g., association information between the manufacturer information and the threshold. For example, the first threshold may correspond to the first manufacturer, and the second threshold may correspond to the second manufacturer. The wireless power transmitting device 101 may set a threshold based on the association information and the manufacturer information provided from the wireless power receiving device 103. The per-manufacturer thresholds may be determined, e.g., experimentally. For example, one manufacturer may have a plurality of models, and experiments may be conducted of measuring the difference between the Q-factor and reference Q-factor while placing each of the plurality of models together with various types of foreign objects in various positions in the charging area. The thresholds may be set to distinguish co-existence of various possible foreign objects for all of the models of the manufacturer (or a designated number of, or more, models, or at least one designated model). In operation 1505, the wireless power transmitting device 101 may identify whether the difference between the Q-factor and reference Q-factor is the threshold or less. In one example, the wireless power transmitting device 101 may identify the difference between the reference Q-factor and the Q-factor measured before entering the power transfer phase. In another example, in the power transfer phase, the wireless power transmitting device 101 may stop application of power for charging during a designated period (also referred to as, e.g., a slot) and perform Q-factor measurement based on application of the Q ping signal and voltage after stopping application. If the Q-factor measurement is completed, the wireless power transmitting device 101 may control the power providing circuit (e.g., at least one of the DC/DC converter 217 or the inverter 218) to again apply the power for charging to the transmission coil 213. If the difference between the Q-factor and the reference Q-factor is the threshold or less (Yes in 1505), the wireless power transmitting device 101 may identify that the foreign object is placed in the charging area in operation 1507. For example, the wireless power transmitting device 101 may determine whether the object is removed based on application of the Q ping signal as described above. If the difference between the Q-factor and the reference Q-factor exceeds the threshold (No in 1505), the wireless power transmitting device 101 may identify that the foreign object is not placed in the charging area in operation 1509. Meanwhile, the embodiment of FIG. 15 may be performed at any time after the standby phase or in the power transfer phase but this is exemplary, and the time of performing is not limited.

Figure 16:
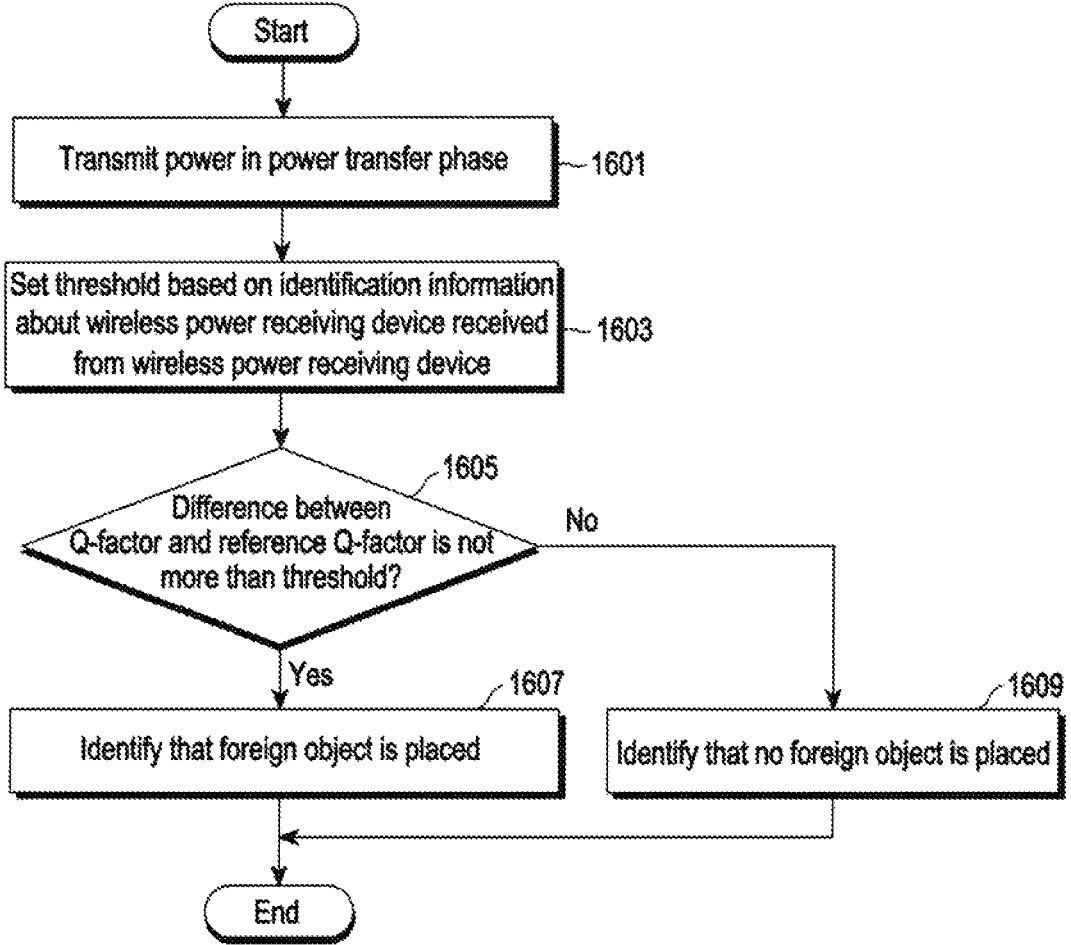
FIG. 16 is a flowchart illustrating a method for operating a wireless power transmitting device according to an embodiment.
Figure 17:
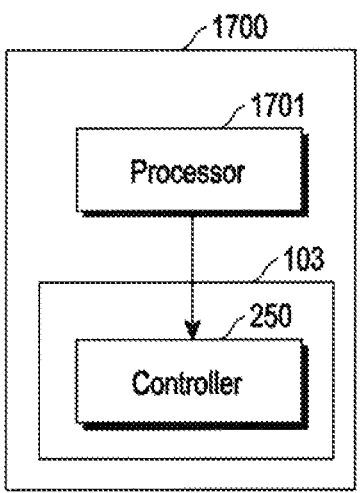
FIG. 17 is a block diagram illustrating an electronic device including a wireless power receiving device according to an embodiment.

FIG. 16 is a flowchart illustrating a method for operating a wireless power transmitting device according to an embodiment. The embodiment of FIG. 16 is described with reference to FIG. 17. FIG. 17 is a block diagram illustrating an electronic device including a wireless power receiving device according to an embodiment.

According to an embodiment, the wireless power transmitting device 101 (e.g., the controller 215) may transmit power in the power transfer phase described in connection with FIG. 3, in operation 1601. In operation 1603, the wireless power transmitting device 101 may set a threshold based on identification information about the wireless power receiving device 103, from the wireless power receiving device 103. For example, the wireless power receiving device 103 may transmit model information, as the identification information about the wireless power receiving device 103, to the wireless power transmitting device 101. For example, referring to FIG. 17, the electronic device 1700 may be the wireless power receiving device 103. In one example, the wireless power receiving device 103 may be implemented with a chip, circuit, or device for wireless power reception included in the electronic device 1700, but this is exemplary. The wireless power receiving device 103 may be implemented as an electronic device including a chip, circuit, or device for wireless power reception, as well as only a chip, circuit, or device for wireless power reception. The electronic device 1700 may be only used for the purpose of describing the processor 1701 outside the wireless power receiving device 103, and it will be appreciated by one of ordinary skill in the art that the wireless power receiving device 103 may be implemented as a finished product, such as a smartphone, tablet PC, home appliance, or vehicle, as well as a chip, circuit, or device for wireless power charging. The electronic device 1700 may include a processor 1701 and a wireless power receiving device 103. The processor 1701 may control the overall operation of the electronic device 1700 and may load and/or manage the model information stored in the electronic device 1700. The processor 1701 may provide the model information about the electronic device 1700 to the controller 215 of the wireless power receiving device 103. The wireless power receiving device 103 may provide the received model information to the wireless power transmitting device 101, and the time of providing it is not limited. The wireless power transmitting device 101 may store, e.g., association information between identification information (e.g., model information) and threshold. For example, the first threshold may correspond to the first model, and the second threshold may correspond to the second model. The wireless power transmitting device 101 may set a threshold based on the association information and the identification information provided from the wireless power receiving device 103. The per-identification information thresholds may be determined, e.g., experimentally. For example, there may be a plurality of models, and an experiment may be conducted of measuring the difference between the Q-factor and reference Q-factor while placing each of the plurality of models together with various types of foreign objects in various positions in the charging area. The threshold may be set so that coexistence of various possible foreign objects may be distinguished for a specific model. In operation 1605, the wireless power transmitting device 101 may identify whether the difference between the Q-factor and reference Q-factor is the threshold or less. If the difference between the Q-factor and the reference Q-factor is the threshold or less (Yes in 1605), the wireless power transmitting device 101 may identify that the foreign object is placed in the charging area in operation 1607. For example, the wireless power transmitting device 101 may determine whether the object is removed based on application of the Q ping signal as described above. If the difference between the Q-factor and the reference Q-factor exceeds the threshold (No in 1605), the wireless power transmitting device 101 may identify that the foreign object is not placed in the charging area in operation 1609. Meanwhile, the embodiment of FIG. 17 may be performed at any time after the standby phase or in the power transfer phase but this is exemplary, and the time of performing is not limited. The processor 1701 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means plus function, unless the element is expressly recited using the phrase "means for." In addition, an artisan understands and appreciates that a "processor" or "microprocessor" may be hardware in the claimed disclosure.

An electronic device 1801 which is an example of the wireless power transmitting device 101 and/or the wireless power receiving device 103 is described below with reference to FIG. 18.

Figure 18:
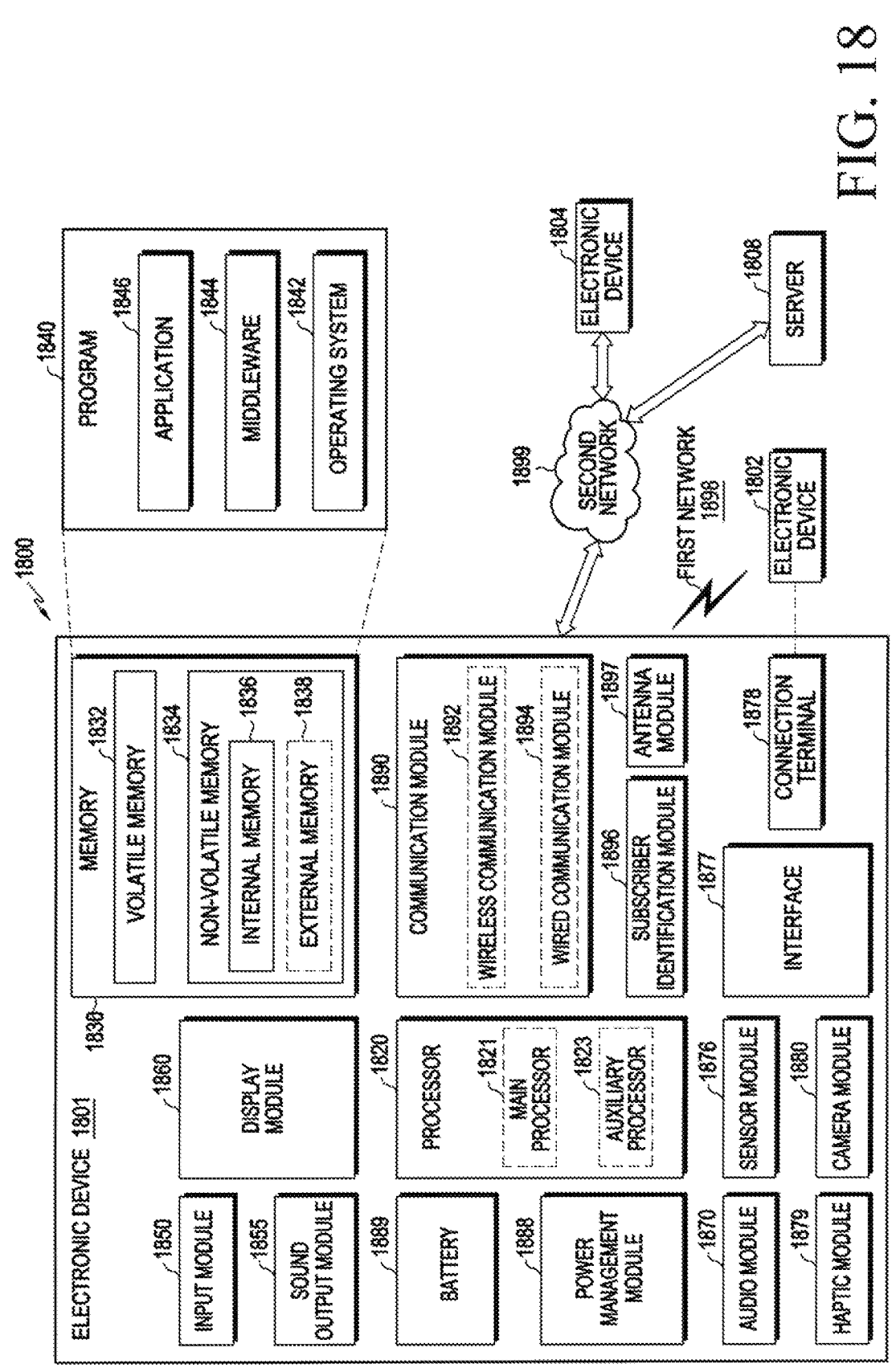
FIG. 18 is a block diagram illustrating an electronic device in a network environment according to an embodiment.

FIG. 18 is a block diagram illustrating an electronic device 1801 in a network environment 1800 according to an embodiment. Referring to FIG. 18, the electronic device 1801 in the network environment 1800 may communicate with an electronic device 1802 (e.g., the external electronic device 1803) via a first network 1898 (e.g., a short-range wireless communication network), or an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one (e.g., the connecting terminal 1878) of the components may be omitted from the electronic device 1801, or one or more other components may be added in the electronic device 101. According to an embodiment, some (e.g., the sensor module 1876, the camera module 1880, or the antenna module 1897) of the components may be integrated into a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1801 includes the main processor 1821 and the auxiliary processor 1823, the auxiliary processor 1823 may be configured to use lower power than the main processor 1821 or to be specified for a designated function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 123. According to an embodiment, the auxiliary processor 1823 (e.g., the neural processing unit) may include a hardware structure specified for artificial intelligence model processing. The artificial intelligence model may be generated via machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by other component (e.g., the processor 1820) of the electronic device 1801, from the outside (e.g., a user) of the electronic device 1801. The input module 1850 may include, for example, a microphone, a mouse, a keyboard, keys (e.g., buttons), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display 1860 may include, for example, a display, a hologram device, or a projector and control circuitry to control a corresponding one of the display, hologram device, and projector. According to an embodiment, the display 1860 may include a touch sensor configured to detect a touch, or a pressure sensor configured to measure the intensity of a force generated by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., the electronic device 1802 (e.g., the external electronic device 1803)) (e.g., a speaker or headphone) directly or wirelessly coupled with the electronic device 1801.

The sensor module 1876 may detect an operational state (e.g., power or temperature) of the electronic device 1801 or an environmental state (e.g., a state of a user) external to the electronic device 101, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802 (e.g., the external electronic device 1803)) directly or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802 (e.g., the external electronic device 1803)). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or motion) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802 (e.g., the external electronic device 1803), the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device 1804 via a first network 1898 (e.g., a short-range communication network, such as Bluetooth™, wireless-fidelity (Wi-Fi) direct, or infrared data association (IrDA)) or a second network 1899 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1892 may identify or authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1897 may transmit or receive a signal or power to or from the outside (e.g., the external electronic device). According to an embodiment, the antenna module 1897 may include one antenna including a radiator formed of a conductor or conductive pattern formed on a substrate (e.g., a printed circuit board (PCB)). According to an embodiment, the antenna module 1897 may include a plurality of antennas (e.g., an antenna array). In this case, at least one antenna appropriate for a communication scheme used in a communication network, such as the first network 1898 or the second network 1899, may be selected from the plurality of antennas by, e.g., the communication module 1890. The signal or the power may then be transmitted or received between the communication module 1890 and the external electronic device via the selected at least one antenna. According to an embodiment, other parts (e.g., radio frequency integrated circuit (RFIC)) than the radiator may be further formed as part of the antenna module 1897.

According to certain embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, a wireless power transmitting device (e.g., the wireless power transmitting device 101) may comprise a transmission coil (e.g., the transmission coil 213), a power providing circuit (e.g., at least one of the DC/DC converter 217 or inverter 218), and at least one controller (e.g., the controller 215). The at least one controller may be configured to control the power providing circuit to apply first power to the transmission coil, identify a resonant frequency, based on a voltage measured at the transmission coil in response to the first power applied to the transmission coil, based on a difference between the identified resonant frequency and a reference frequency meeting a designated condition, identify that a foreign object is placed on a charging area of the wireless power transmitting device, based on the difference between the identified resonant frequency and the reference frequency failing to meet the designated condition, control the power providing circuit to apply, to the transmission coil, at least one second power for performing communication with a wireless power receiving device, based on receiving at least one response from the wireless power receiving device while applying the at least one second power, identify a reference Q-factor and/or another reference frequency based on the at least one response, identify whether the wireless power receiving device is placed on the charging area, or both the wireless power receiving device and the foreign object are placed on the charging area, based on a difference between an identified Q-factor and the reference Q-factor and/or a difference between the identified resonant frequency and the other reference frequency, and based on receiving no response from the wireless power receiving device while applying the at least one second power, identify that the wireless power receiving device is placed a designated distance or more away from a point of the charging area of the wireless power transmitting device.

According to an embodiment, the reference frequency may be identified based on a voltage measured at the transmission coil after application of another first power to the transmission coil is stopped while no object is placed on the charging area. The other first power may be applied to the transmission coil before the first power is applied to the transmission coil.

According to an embodiment, the reference frequency may be previously stored in the wireless power transmitting device or is identified based on information previously stored in the wireless power transmitting device.

According to an embodiment, the at least one controller may be further configured to identify that the difference between the identified resonant frequency and the reference frequency meets the designated condition, based on a result of dividing the identified resonant frequency minus the reference frequency by the reference frequency exceeding a threshold.

According to an embodiment, the at least one controller may be configured to, as part of controlling the power providing circuit to apply the at least one second power to the transmission coil, based on receiving no response from the wireless power receiving device while applying one of the at least one second power to the transmission coil, control the power providing circuit to apply another one of the at least one second power to the transmission coil after a designated period.

According to an embodiment, a magnitude of the one of the at least one second power may be smaller than a magnitude of the other one of the at least one second power, or the magnitude of the one of the at least one second power may be substantially identical to the magnitude of the other one of the at least one second power.

The at least one controller may be further configured to control the wireless power transmitting device to output a first alarm, based on identifying that the foreign object is placed on the charging area, and control the wireless power transmitting device to output a second alarm, based on identifying that the wireless power receiving device is placed the designated distance or more away from the one point of the charging area.

According to an embodiment, the at least one controller may be further configured to control the power providing circuit to apply another first power to the transmission coil while outputting the first alarm or the second alarm, identify another Q-factor based on a voltage measured at the transmission coil after application of the other first power is stopped, maintain the output of the first alarm or the second alarm, based on a difference between the other Q-factor and the reference Q-factor meeting another designated condition, and stop the output of the first alarm or the second alarm, based on the difference between the other Q-factor and the reference Q-factor failing to meet the other designated condition.

According to an embodiment, the at least one controller may be further configured to perform at least one operation configured for charging the wireless power receiving device, based on identifying the at least one response from the wireless power receiving device.

According to an embodiment, the at least one controller may be configured to, as at least part of performing the at least one operation configured for charging the wireless power receiving device, identify another Q-factor based on a voltage measured at the transmission coil, after application of the first power or application of another first power different from the first power is stopped, and identify a difference between the other Q-factor and another reference Q-factor.

According to an embodiment, the at least one controller may be configured to, as at least part of performing the at least one operation configured for charging the wireless power receiving device, control the power providing circuit to apply a first magnitude of power for charging to the transmission coil, based on the difference between the other Q-factor and the other reference Q-factor exceeding a first threshold, control the power providing circuit to apply a second magnitude of power for charging, smaller than the first magnitude, to the transmission coil, based on the difference between the other Q-factor and the other reference Q-factor being smaller than or equal to the first threshold and being more than a second threshold smaller than the first threshold, and identify that the foreign object and the wireless power receiving device are placed on the charging area, based on the difference between the other Q-factor and the other reference Q-factor being smaller than or equal to the second threshold.

According to an embodiment, the at least one controller may be configured to, as at least part of performing the at least one operation configured for charging the wireless power receiving device, based on identifying that a power profile of the wireless power receiving device is a baseline power profile, control the power providing circuit to apply the first magnitude of power for charging, control the power providing circuit to apply the second magnitude of power for charging, or identify that the foreign object and the wireless power receiving device are placed on the charging area.

According to an embodiment, the at least one controller may be configured to, as at least part of performing the at least one operation configured for charging the wireless power receiving device, identify a temperature at at least one point of the wireless power transmitting device while applying the second magnitude of power for charging to the transmission coil, and maintain the second magnitude of power for charging or adjust a magnitude of power for charging, based on the identified temperature.

According to an embodiment, the at least one controller may be configured to, as at least part of performing the at least one operation configured for charging the wireless power receiving device, control the power providing circuit to provide power for charging the wireless power receiving device to the transmission coil, and identify that the foreign object and the wireless power receiving device are placed on the charging area, based on a difference between the other Q-factor and the reference Q-factor, corresponding to the wireless power receiving device and identified based on information received from the wireless power receiving device, exceeding a threshold, while providing the power for charging the wireless power receiving device to the transmission coil.

According to an embodiment, the information received from the wireless power receiving device may be identification information about the wireless power receiving device and/or manufacturer information about the wireless power receiving device.

According to an embodiment, the at least one controller may be further configured to, identify that both the wireless power receiving device and the foreign object are placed on the charging area, based on the difference between the identified Q-factor and the reference Q-factor exceeding a first threshold and/or the difference between the identified resonant frequency and the another reference frequency exceeding a second threshold, and identify that the wireless power receiving device is placed on the charging area, based on the difference between the identified Q-factor and the reference Q-factor being smaller than or equal to the first threshold and/or the difference between the identified resonant frequency and the other reference frequency being smaller than or equal to the second threshold.

According to an embodiment, a method for operating a wireless power transmitting device including a transmission coil and a power providing circuit may comprise controlling the power providing circuit to apply first power to the transmission coil, identifying a resonant frequency, based on a voltage measured at the transmission coil in response to the first power applied to the transmission coil, based on a difference between the identified resonant frequency and a reference frequency meeting a designated condition, identifying that a foreign object is placed on a charging area of the wireless power transmitting device, based on the difference between the identified resonant frequency and the reference frequency failing to meet the designated condition, controlling the power providing circuit to apply, to the transmission coil, at least one second power for performing communication with a wireless power receiving device, based on receiving at least one response from the wireless power receiving device while applying the at least one second power, identifying a reference Q-factor and/or another reference frequency based on the at least one response, identifying whether the wireless power receiving device is placed on the charging area, or both the wireless power receiving device and the foreign object are placed on the charging area, based on a difference between an identified Q-factor and the reference Q-factor and/or a difference between the identified resonant frequency and the other reference frequency, and based on receiving no response from the wireless power receiving device while applying the at least one second power, identifying that the wireless power receiving device is placed a designated distance or more away from a point of the charging area of the wireless power transmitting device.

According to an embodiment, the controlling of the power providing circuit to apply the at least one second power may further include, based on receiving no response from the wireless power receiving device while applying one of the at least one second power to the transmission coil, controlling the power providing circuit to apply another one of the at least one second power to the transmission coil after a designated period.

According to an embodiment, a magnitude of the one of the at least one second power may be smaller than a magnitude of the other one of the at least one second power, or the magnitude of the one of the at least one second power may be substantially identical to the magnitude of the other one of the at least one second power.

According to an embodiment, the method may further comprise controlling the wireless power transmitting device to output a first alarm, based on identifying that the foreign object is placed on the charging area, and controlling the wireless power transmitting device to output a second alarm, based on identifying that the wireless power receiving device is placed the designated distance or more away from the one point of the charging area.

An electronic device (e.g., the wireless power transmitting device 101 and/or the wireless power receiving device 103) according to certain embodiments of the disclosure may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory or external memory) that is readable by a machine. For example, a processor (e.g., the processor 120) of the machine (e.g., the RIC 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A wireless power transmitting device comprising:
a transmission coil;
a power providing circuit;
at least one controller; and
memory storing instructions,
wherein the instructions, when executed by the at least one controller individually or collectively cause the wireless power transmitting device to:
control the power providing circuit to apply first power to the transmission coil,
identify a resonant frequency, based on a voltage measured at the transmission coil in response to the first power applied to the transmission coil,
identify a reference frequency in the wireless power transmitting device,
based on a difference between the identified resonant frequency and the reference frequency meeting a designated condition, identify that a foreign object is placed on a charging area of the wireless power transmitting device, and
based on the difference between the identified resonant frequency and the reference frequency failing to meet the designated condition:
control the power providing circuit to apply, to the transmission coil, at least one second power for performing communication with a wireless power receiving device,
receive at least one response from the wireless power receiving device while applying the at least one second power,
obtain another reference frequency included in the at least one response,
based on a difference between the identified resonant frequency and the other reference frequency, determine whether the wireless power receiving device is placed on the charging area, or both the wireless power receiving device and the foreign object are placed on the charging area, and
in case of receiving no response from the wireless power receiving device, control the power providing circuit to stop applying the at least one second power.

2. The wireless power transmitting device of claim 1, wherein the reference frequency is identified based on a voltage measured at the transmission coil after application of another first power to the transmission coil is stopped while no object is placed on the charging area, and
wherein the other first power is applied to the transmission coil before the first power is applied to the transmission coil.

3. The wireless power transmitting device of claim 1, wherein the reference frequency is previously stored in the wireless power transmitting device or is identified based on information previously stored in the wireless power transmitting device.

4. The wireless power transmitting device of claim 1, wherein the instructions, when executed by the at least one controller individually or collectively, cause the wireless power transmitting device to identify that the difference between the identified resonant frequency and the reference frequency meets the designated condition, based on a result of dividing the identified resonant frequency minus the reference frequency by the reference frequency exceeding a threshold.

5. The wireless power transmitting device of claim 1, wherein the instructions, when executed by the at least one controller individually or collectively, cause the wireless power transmitting device to, as part of controlling the power providing circuit to apply the at least one second power to the transmission coil:
based on receiving no response from the wireless power receiving device while applying one of the at least one second power to the transmission coil, control the power providing circuit to apply another one of the at least one second power to the transmission coil after a designated period.

6. The wireless power transmitting device of claim 5, wherein a magnitude of the one of the at least one second power is smaller than a magnitude of the other one of the at least one second power, or
the magnitude of the one of the at least one second power is substantially identical to the magnitude of the other one of the at least one second power.

7. The wireless power transmitting device of claim 1, wherein the instructions, when executed by the at least one controller individually or collectively, cause the wireless power transmitting device to:
control the wireless power transmitting device to output a first alarm, based on identifying that the foreign object is placed on the charging area, and
control the wireless power transmitting device to output a second alarm, based on identifying that the wireless power receiving device is placed the designated distance or more away from the one point of the charging area.

8. The wireless power transmitting device of claim 7, wherein the instructions, when executed by the at least one controller individually or collectively, cause the wireless power transmitting device to:
control the power providing circuit to apply another first power to the transmission coil while outputting the first alarm or the second alarm, identify another Q-factor based on a voltage measured at the transmission coil after application of the other first power is stopped, maintain the output of the first alarm or the second alarm, based on a difference between the other Q-factor and a reference Q-factor meeting another designated condition, and stop the output of the first alarm or the second alarm, based on the difference between the other Q-factor and the reference Q-factor failing to meet the other designated condition.

9. The wireless power transmitting device of claim 1, wherein the instructions, when executed by the at least one controller individually or collectively, cause the wireless power transmitting device to perform at least one operation configured for charging the wireless power receiving device, based on identifying the at least one response from the wireless power receiving device.

10. The wireless power transmitting device of claim 9, wherein the instructions, when executed by the at least one controller individually or collectively, cause the wireless power transmitting device to, as at least part of performing the at least one operation configured for charging the wireless power receiving device:

identify another Q-factor based on a voltage measured at the transmission coil, after application of the first power or application of another first power different from the first power is stopped, and identify a difference between the other Q-factor and another reference Q-factor.

11. The wireless power transmitting device of claim 10, wherein the instructions, when executed by the at least one controller individually or collectively, cause the wireless power transmitting device to, as at least part of performing the at least one operation configured for charging the wireless power receiving device:

control the power providing circuit to apply a first magnitude of power for charging to the transmission coil, based on the difference between the other Q-factor and the other reference Q-factor exceeding a first threshold, control the power providing circuit to apply a second magnitude of power for charging, smaller than the first magnitude, to the transmission coil, based on the difference between the other Q-factor and the other reference Q-factor being smaller than or equal to the first threshold and being more than a second threshold smaller than the first threshold, and identify that the foreign object and the wireless power receiving device are placed on the charging area, based on the difference between the other Q-factor and the other reference Q-factor being smaller than or equal to the second threshold.

12. The wireless power transmitting device of claim 11, wherein the instructions, when executed by the at least one controller individually or collectively, cause the wireless power transmitting device to, as at least part of performing the at least one operation configured for charging the wireless power receiving device:

based on identifying that a power profile of the wireless power receiving device is a baseline power profile, control the power providing circuit to apply the first magnitude of power for charging, control the power providing circuit to apply the second magnitude of power for charging, or identify that the foreign object and the wireless power receiving device are placed on the charging area.

13. The wireless power transmitting device of claim 11, wherein the instructions, when executed by the at least one controller individually or collectively, cause the wireless power transmitting device to, as at least part of performing the at least one operation configured for charging the wireless power receiving device:

identify a temperature at at least one point of the wireless power transmitting device while applying the second magnitude of power for charging to the transmission coil, and maintain the second magnitude of power for charging or adjust a magnitude of power for charging, based on the identified temperature.

14. The wireless power transmitting device of claim 10, wherein the instructions, when executed by the at least one controller individually or collectively, cause the wireless power transmitting device to, as at least part of performing the at least one operation configured for charging the wireless power receiving device:

control the power providing circuit to provide power for charging the wireless power receiving device to the transmission coil, and identify that the foreign object and the wireless power receiving device are placed on the charging area, based on a difference between the other Q-factor and the reference Q-factor, corresponding to the wireless power receiving device and identified based on information received from the wireless power receiving device, exceeding a threshold, while providing the power for charging the wireless power receiving device to the transmission coil.

15. The wireless power transmitting device of claim 14, wherein the information received from the wireless power receiving device is identification information about the wireless power receiving device and/or manufacturer information about the wireless power receiving device.

16. The wireless power transmitting device of claim 1, wherein the instructions, when executed by the at least one controller individually or collectively, cause the wireless power transmitting device to:

identify that both the wireless power receiving device and the foreign object are placed on the charging area, based on the difference between the identified Q-factor and the reference Q-factor exceeding a first threshold and/or the difference between the identified resonant frequency and the other reference frequency exceeding a second threshold, and identify that the wireless power receiving device is placed on the charging area, based on the difference between the identified Q-factor and the reference Q-factor being smaller than or equal to the first threshold and/or the difference between the identified resonant frequency and the other reference frequency being smaller than or equal to the second threshold.

17. A method for operating a wireless power transmitting device including a transmission coil and a power providing circuit, the method comprising, controlling the power providing circuit to apply first power to the transmission coil;

identifying a resonant frequency, based on a voltage measured at the transmission coil in response to the first power applied to the transmission coil;

identifying a reference frequency in the wireless power transmitting device, based on a difference between the identified resonant frequency and the reference frequency meeting a designated condition, identifying that a foreign object is placed on a charging area of the wireless power transmitting device; and based on the difference between the identified resonant frequency and the reference frequency failing to meet the designated condition:

controlling the power providing circuit to apply, to the transmission coil, at least one second power for performing communication with a wireless power receiving device, receiving at least one response from the wireless power receiving device while applying the at least one second power, obtaining another reference frequency included in the at least one response, based on a difference between the identified resonant frequency and the other reference frequency, determining whether the wireless power receiving device is placed on the charging area, or both the wireless power receiving device and the foreign object are placed on the charging area, and in case of receiving no response from the wireless power receiving device, controlling the power providing circuit to stop applying the at least one second power.

18. The method of claim 17, wherein the controlling of the power providing circuit to apply the at least one second power further comprises:

based on receiving no response from the wireless power receiving device while applying one of the at least one second power to the transmission coil, controlling the power providing circuit to apply another one of the at least one second power to the transmission coil after a designated period.

19. The method of claim 18, wherein a magnitude of the one of the at least one second power is smaller than a magnitude of the other one of the at least one second power, or the magnitude of the one of the at least one second power is substantially identical to the magnitude of the other one of the at least one second power.

20. The method of claim 17, further comprising:

controlling the wireless power transmitting device to output a first alarm, based on identifying that the foreign object is placed on the charging area, and controlling the wireless power transmitting device to output a second alarm, based on identifying that the wireless power receiving device is placed the designated distance or more away from the one point of the charging area.

21. The wireless power transmitting device of claim 1, wherein the reference frequency is prestored in the wireless power transmitting device.

22. The wireless power transmitting device of claim 1, wherein the first power is a Q ping signal and the at least one second power is a D ping signal.

* * * * *